United States Patent [19]
Calvert et al.

[11] Patent Number: 5,349,674
[45] Date of Patent: Sep. 20, 1994

[54] AUTOMATED ENROLLMENT OF A COMPUTER SYSTEM INTO A SERVICE NETWORK OF COMPUTER SYSTEMS

[75] Inventors: Nathanial Calvert; John L. Koehler; Erik D. Lindberg; Mark A. McKelvey; Steven P. Mervosh; Jeffrey A. Newton; George B. Scarborough; Ruth A. Upchurch; Sandra D. Westling, all of Rochester, Minn.

[73] Assignee: International Business Machines Corp., Armonk, N.Y.

[21] Appl. No.: 569,110

[22] Filed: Aug. 17, 1990

[51] Int. Cl.$^5$ .............................................. G06F 13/14
[52] U.S. Cl. ..................... 395/800; 395/575; 364/DIG. 1; 364/242.94; 364/265; 364/284; 364/284.3; 364/284.4; 364/285
[58] Field of Search .............. 395/575, 800, 325, 325, 395/725; 371/15.1, 16.1, 18, 29.1; 340/825.06, 825.08; 379/245, 89

[56] References Cited

U.S. PATENT DOCUMENTS

| | | | |
|---|---|---|---|
| 4,517,468 | 5/1985 | Kemper et al. | 290/52 |
| 4,654,852 | 3/1987 | Bentley et al. | 371/29 |
| 4,707,825 | 11/1987 | Amstutz et al. | 370/60 |
| 4,823,343 | 4/1989 | Takahashi | 371/16 |
| 4,868,763 | 9/1989 | Masui et al. | 364/513 |
| 4,884,218 | 11/1989 | Agnew et al. | 364/513 |
| 4,933,967 | 6/1990 | Lo et al. | 379/207 |
| 5,237,688 | 8/1993 | Calvert et al. | 395/700 |
| 5,287,505 | 2/1994 | Calvert et al. | 364/400 |

FOREIGN PATENT DOCUMENTS

| | | |
|---|---|---|
| 0068106 | 1/1983 | European Pat. Off. . |
| 0333620 | 3/1989 | European Pat. Off. . |
| 0376869 | 11/1989 | European Pat. Off. . |

OTHER PUBLICATIONS

Nachrichten Electronik & Telematik, vol. 40, No. Spec. 2, Oct. 1986, pp. 45–46; "PC Checkt PC" (translation submitted herewith).

R. Allison "ICL Series 39 Support Process" ICL Technical Journal, vol. 6, No. 1, May 1988, Oxford, Gr. Britain (pp. 2–16).

"Automated Problem Reporting", IBM Technical Disclosure Bulletin, vol. 32, No. 6A, Nov. 1989, pp. 466–468.

Primary Examiner—Paul V. Kulik
Attorney, Agent, or Firm—Curtis G. Rose; Steven W. Roth

[57] ABSTRACT

A service network has several computer systems connected together. A computer system can either be a "Service Requestor" (SR), a "Service Provider" (SP), or a hybrid of the two, a "Service Provider/Requestor" (SP/R). The service network is built by an enrollment process that adds computer systems into the service network. A SP (or SP/R acting as an SP) already in the network can initiate the enrollment of an SR (or SP/R acting as an SR) into the network. In addition, a SR (or SP/R acting as an SR) can initiate a request for enrollment into the network. If such a request is initiated, it must be approved automatically or with human intervention.

12 Claims, 46 Drawing Sheets

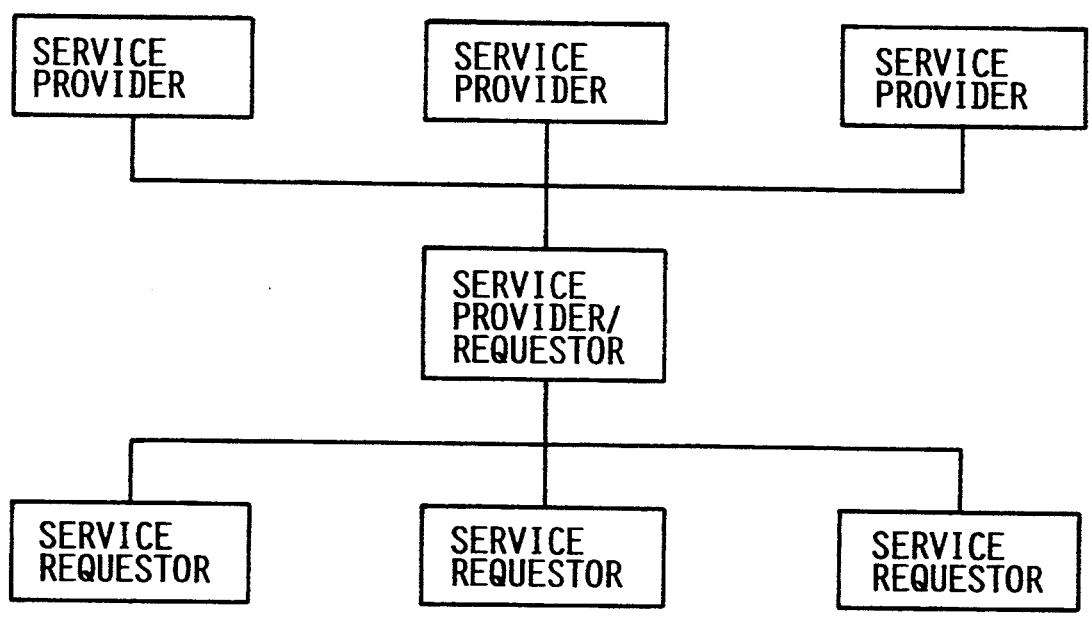
FIG. IB

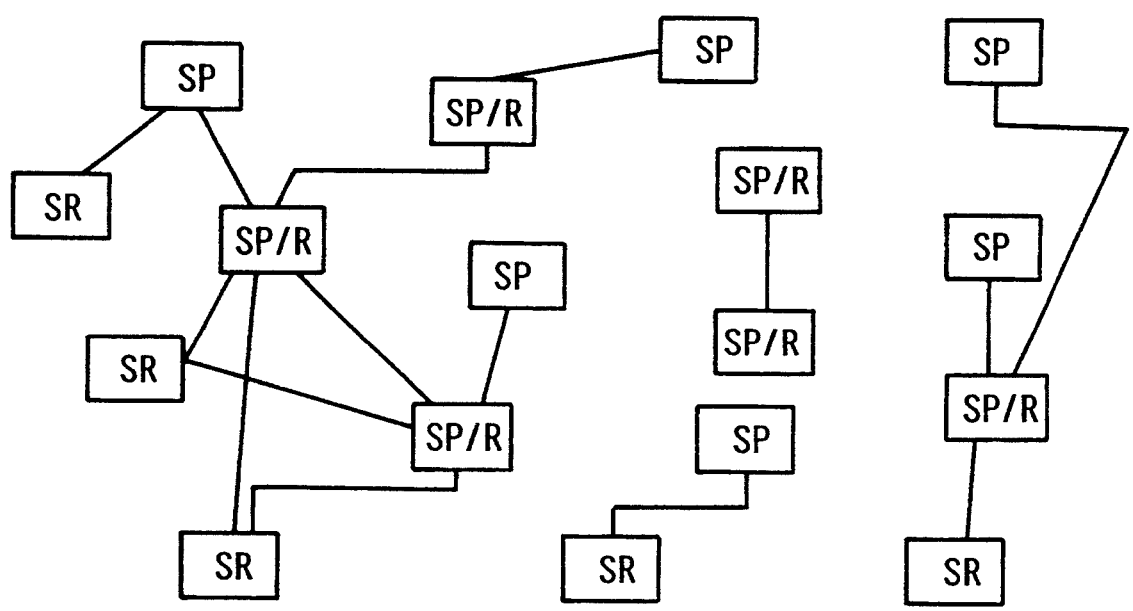
FIG. ID

SERVICE PROVIDER/REQUESTOR

SERVICE PROVIDER/REQUESTOR

FIG. 3A

| PROBLEM ID | STATUS | MACHINE INFO | INITIAL FRU LIST | ISOLATION FRU LIST | FINAL FRU LIST |
|---|---|---|---|---|---|

| SYMPTOM STRING | SOLUTION INFORMATION | ORIGINATING SYSTEM | RECEIVED FROM SYSTEM | SENT TO SYSTEM | PROBLEM RESOLUTION ACTIVITY |
|---|---|---|---|---|---|

FIG. 3C

| NETWORK ID CONTROL POINT | COMPONENT ID | VERSION/ RELEASE LEVEL | SOLUTION INFORMATION | SOLUTION STATUS -ON ORDER -RECEIVED -APPLIED -REMOVED | SOLUTION DESCRIPTION | SYMPTOM STRING | REQUISITES |
|---|---|---|---|---|---|---|---|

| PROBLEM ID | CUSTOMER DATA | MACHINE INFO | DESTINATION ID | PROBLEM DATA | INITIAL FRU LIST | ISOLATION FRU LIST | TEXTUAL PROBLEM DESCRIPTION |
|---|---|---|---|---|---|---|---|

FIG. 3B₁

| PROBLEM ID | CUSTOMER DATA | MACHINE INFO | DESTINATION ID | PROBLEM PREVENTION REQUEST | COMPONENT ID | | |
|---|---|---|---|---|---|---|---|

FIG. 3B₂

FIG. 3B SERVICE REQUEST

| CUSTOMER DESCRIPTION DATA | SYSTEM TYPE | SYSTEM SERIAL # | NETWORK ID | CONTROL POINT | ENTITLEMENT STATUS -ENTITLED -NOT ENTITLED | COMPONENT ID LIST |

FIG. 4A

| COMPONENT ID | NETWORK ID | CONTROL POINT | STATUS -OPENED -REQUESTED -APPROVED -REJECTED | AUTOMATIC INSTALL INFORMATION | PROBLEM PREVENTION INFORMATION |

FIG. 4B

```
                Change Service Provider Attributes
                                                           System: SFIXIT
Type information, press Enter.

Service attributes:
  Log remote problems . . . . . . .   YES      YES, NO
  Send PTFs automatically . . . . .   YES      YES, NO
  Message queue . . . . . . . . . .   _____
    Library . . . . . . . . . . . .   _____
  Maximum distribution. . . . . . .   200      0-5000
  Hold PTFs received. . . . . . . .   NO       YES, NO
  Automatic enrollment. . . . . . .   YES      YES, NO Bottom
F3=Exit  F5=Refresh  F12=Cancel
```

FIG. 5B

```
                    Work with Service Requesters           System: SFIXIT

Position to  . . . . . .           Control point
Network ID.  . . . . .

Type options, press Enter.
 1=Add    2=Change    3=Copy    4=Remove    5=Display Control
Opt  Point      Network ID    Description
     JOE        SFIXIT        Joe's Deli
     WILLIE     SFIXIT        Willie's Widgets
     LEFTY      SFIXIT        Lefty's Scissors Bottom F3=Exit   F5=Refresh   F12=Cancel
```

FIG. 5C

```
Add Service Requester                System: SFIXIT

Control point . . . . . . . . . :  PETE
Network ID. . . . . . . . . . . :  SFIXIT
Description . . . . . . . . . . :  PETE'S CATERING Type changes, press Enter.

Contact . . . . . . . . . . . . .  PETER PIPER
Contact telephone numbers:
  Primary . . . . . . . . . . . .  (811) 555-1111
  Alternative . . . . . . . . . .  (811) 555-1101
Mailing address:
  Street address  . . . . . . . .  1825 5th Street
  City/State  . . . . . . . . . .  Podunk, MN
  Country . . . . . . . . . . . .  USA
  Zip code  . . . . . . . . . . .  55555
  Machine type  . . . . . . . . .  1111
  Serial number . . . . . . . . .  11-1111111

More. . .
F3=Exit  F5=Refresh  F12=Cancel  F17=Work with entitled products
```

FIG. 5D

```
                Add Service Requester                    System: SFIXIT

Control point . . . . . . :    PETE
Network identifier. . . . :    SFIXIT

Type information, press Enter.

Service attributes:
  Log remote problems . . . . . . .    YES      YES, NO
  Send PTFs automatically . . . . .    YES      YES, NO
  Message queue . . . . . . . . . .    _____
    Library . . . . . . . . . . .
  Maximum distribution. . . . . . .    200      0-5000
  Hold PTFs received. . . . . . . .    NO       YES, NO
  Automatic enrollment. . . . . . .    YES      YES, NO Bottom
F3=Exit  F5=Refresh  F12=Cancel
```

FIG. 5E

```
                        Working with Entitled Components
                                                                  System: SFIXIT
Position to . . . . . :              Starting characters Type options, press Enter.
  4=Remove support  8=Work with supported language features
  9=Problem Prevention  10=Specify Destination ID for other SP Serial/
Opt   Component  Option   Description
      5728999    *BASE    Operating System
      5713SS1    2        Spreadsheet
      5744SS1    10       Word Processor
      5745CB1    1        Recipe Database More. . .

Command
===>
F3=Exit  F5=Refresh  F12=Cancel  F14=Support additional products
```

```
                Work with Unsupported but Available Components
                                                   System: SFIXIT
Position to  . . . . .

Type options, press Enter.          Starting characters
  1=Support

Serial/
Opt  Product  Option  Description
     3115CB1  1       Spell Checker
     4567CC4  5       Flowchart Program
     4545AA2  89      Presentation Graphics Program More. . .

Command
===>
F3=Exit  F5=Refresh  F12=Cancel
```

```
                Work with Supported Language Features
                                                            System: FIXIT
Product: 5745CB1         Recipe Database Type options, press Enter.
 4=Remove support Language
Opt    Feature    Description
       2922       Portuguese
       2923       Dutch
       2924       English
       2925       Finnish
       2926       Danish
       2928       French
       2929       German
       2931       Spanish
       2932       Italian
       2958       Icelandic
                                                              Bottom
Command
===>
F3=Exit  F5=Refresh  F12=Cancel  F14=Support additional language features
```

FIG. 5H

```
              Work with Service Providers          System: PETE

Position to  . . . . . .
Network ID.  . . . . .

Type options, press Enter.
  1=Add   2=Change   3=Copy   4=Remove   5=Display

Contol
   Opt  Point        Network ID      Description
        SYSTEM       SFIXIT          Software Fixit Shoppe Bottom F3=Exit   F5=Refresh   F12=Cancel
```

FIG. 6B

```
                          Add Service Provider              System: PETE

Control point . . . . . . . . . :   SYSTEM
Network ID. . . . . . . . . . . :   HFIXIT
Description . . . . . . . . . . :   Hardware Fixit Shoppe Type changes, press Enter.

Contact . . . . . . . . . . . . . .   Josephene Hardware
Contact telephone numbers:
  Primary. . . . . . . . . . . . .   (411) 332-1111
  Alternative. . . . . . . . . . .   (411) 332-1234
Mailing address:
  Street address . . . . . . . . .   1434 Nutsandbolts Street City/State . . . . . . . . . . .   Gear City, OR
  Country. . . . . . . . . . . . .   USA
  Zip code . . . . . . . . . . . .   99911
Machine type. . . . . . . . . . . .   1111
Serial number . . . . . . . . . . .   11-1111111

More. . .

F3=Exit  F5=Refresh  F12=Cancel  F17=Work with entitled products
```

FIG. 6C₁

```
Add Service Provider                    System: PETE

Control point . . . . . . :   SYSTEM
Network identifier. . . . :   HFIXIT

Type information, press Enter.

Service attributes:
  Log remote problems . . . . . . .   YES      YES, NO
  Send PTFs automatically . . . . .   YES      YES, NO
  Message queue . . . . . . . . . .   _____
    Library . . . . . . . . . . . .   _____
  Maximum distribution. . . . . . .   200      0-5000
  Hold PTFs received. . . . . . . .   NO       YES, NO
  Automatic enrollment. . . . . . .   YES      YES, NO Bottom
F3=Exit   F5=Refresh   F12=Cancel
```

FIG. 6C₂

```
                Working with Entitled Components
                                                      System: HFIXIT
Position to . . . . . .          Starting characters Type options, press Enter.
4=Remove support  8=Work with supported language features
9=Problem Prevention  10=Specify Destination ID for other SP Serial/
Opt  Component  Option   Description
     4323333    111111   Disk Unit
     4353331    132435   Memory
     4325667    222222   Display
     4567890    333333   Diskette Drive
     5656767    334343   Keyboard More. . .
Command
===>
F3=Exit  F5=Refresh  F12=Cancel  F14=Support additional products
```

FIG. 6D

```
                    Display Problem Details              System: PETE

Problem ID. . . . . . . . . . :   1234567890
Current status . . . . . . . . :   ANSWERED
Problem  . . . . . . . . . . . :   Can't Find Meat Loaf Recipe Problem message ID . . . . . . . . . . . . . . . :  CPFXXXX
Severity . . . . . . . . . . . . . . . . . . . . :  Medium
Problem type . . . . . . . . . . . . . . . . . . :  User perceived
Date and time detected . . . . . . . . . . . . . :  12/12/90  09:10:00
Reported to. . . . . . . . . . . . . . . . . . . :  Software Fixit Shoppe More. . .

Press Enter to continue.

F3=Exit        F5=Display possible causes       F6=Display problem history
F9=Display PTFs   F12=Cancel   F14=Display notes   F24=More keys
```

```
              Display Problem History           System: PETE

Problem ID:. . . . . . . :  1234567890
Current status . . . . . :  ANSWERED
Problem  . . . . . . . . :  Can't Find Meat Loaf Recipe Date      Time      User ID    Event
12/12/90  09:10:00  PETE       Problem entry opened
12/12/90  09:10:00  PETE       Problem analyzed
12/12/90  09:12:00  PETE       Prepared to report
12/12/90  09:13:00  PETE       Service request sent
12/12/90  09:15:00  *SYSTEM    Problem answered Bottom Press Enter to continue.

F3=Exit  F12=Cancel
```

```
              Display Problem Details            System: SFIXIT

Problem ID . . . . . . . . :  1234567890
Origin . . . . . . . . . . :  SFIXIT.PETE
Current status . . . . . . :  ANSWERED
Problem  . . . . . . . . . :  Can't Find Meat Loaf Recipe Problem message ID . . . . :  CPFXXXX
Severity . . . . . . . . . :  Medium
Problem type . . . . . . . :  User perceived
Date and time detected . . :  12/12/90  09:10:00
Received from. . . . . . . :  SFIXIT.PETE More. . .

Press Enter to continue.

F3=Exit         F5=Display possible causes    F6=Display problem history
F9=Display PTFs F12=Cancel  F14=Display notes  F24=More keys
```

FIG. 20C

```
                Display Problem History         System: SFIXIT

Problem ID . . . . . . . :  1234567890
Current status . . . . . :  ANSWERED
Problem  . . . . . . . . :  Can't Find Meat Loaf Recipe Date      Time      User ID    Event
12/12/90  09:13:10  *SYSTEM    Request received
12/12/90  09:14:20  *SYSTEM    Problem answered
12/12/90  09:15:00  *SYSTEM    Response sent
12/12/90  09:15:21  *SYSTEM    Fixes transmitted Bottom
Press Enter to continue.

F3=Exit  F12=Cancel
```

FIG. 20D

AUTOMATED ENROLLMENT OF A COMPUTER SYSTEM INTO A SERVICE NETWORK OF COMPUTER SYSTEMS

FIELD OF THE INVENTION

This invention relates to the data processing field. More particularly, this invention provides for automated enrollment of a computer system into a service network of computer systems.

RELATED APPLICATIONS

The following co-pending patent applications are commonly assigned, were filed on the same data as this patent application, and are related:

FLEXIBLE SERVICE NETWORK FOR COMPUTER SYSTEMS Ser. No. 07/569,119 date filed Aug. 17, 1990.

TRACKING THE RESOLUTION OF A PROBLEM ON A COMPUTER SYSTEM IN A SERVICE NETWORK OF COMPUTER SYSTEMS Ser. No. 07/569,109 date filed Aug. 17, 1990, now abandoned in favor of file wrapper continuation Ser. No. 08/041,285 date filed Mar. 30, 1993.

PROBLEM PREVENTION ON A COMPUTER SYSTEM IN A SERVICE NETWORK OF COMPUTER SYSTEMS Ser. No. 07/570,110 date filed Aug. 17, 1990, now abandoned in favor of file wrapper continuation Ser. No. 08/089,061 filed Jul. 8, 1993.

BACKGROUND OF THE INVENTION

Servicing midrange and mainframe data-processing systems is a major segment of the data-processing industry. A manufacturer or large company may employ as many people for repair and service as for sales or for development of new systems. Servicing requires extensive networks of service representatives, parts inventories, software, and physical facilities. Ironically, the servicing of data-processing systems relies heavily on human labor and mental effort.

U.S. Pat. No. 4,654,852 to A. M. Bentley et al. proposes one step toward more automated repair of data-processing systems. That patent allows an operator to run problem-determination procedures (PDPs) stored in the system itself. The PDPs can themselves determine which components are present in the system and run tests against them, using the results of previous tests to determine which PDPs to run next. These PDPs can also request the operator to perform actions, such as setting controls, disconnecting cables, and restarting programs. The PDPs propose problem solutions as messages to the operator recommending that certain actions be taken, or that certain service representatives be summoned.

A centralized service data-processing system has also been established; for example, the IBM "RETAIN" network has been available for many years. A customer can telephone the nation-wide facility and relate a problem on his system to a service representative, either a customer engineer (CE) or product support staff. The representative attempts to diagnose the problem by asking the customer what symptoms his system experiences, and what hardware and software components are present on the system. As the customer answers these questions, the service rep enters certain key words into a terminal. When he is satisfied that he has sufficiently characterized the problem, the rep accesses one or more problem-management data bases stored in the central system, using the key words as search arguments. Each entry in the data base has one or more key words and descriptions of proposed solutions for problems involving those key words.

U.S. Pat. No. 5,287,505, to Calvert et al, owned by the assignee of the present application, discloses a computer system that is able to detect a problem and send a service request to a central service system. The central service system receives the service request and checks a database to see if a solution to the problem is known. If so, solution information is automatically sent to the computer system.

The above patent to Calvert et al represents a significant advancement in the field of computer system service. However, Calvert et al's computer system requiring service could only send service requests to one central service system. In addition, if the central service system could not find a fix for the problem in its database, it had to notify a support center where a human being would have to look into the problem further. The central service system could therefore only automatically fix a subset of the problems likely to be encountered by the computer systems looking to it for service. This problem is magnified when one considers that most computer systems today contain hardware and software manufactured by several different vendors. In addition, computer systems can be radically different in hardware and software configurations and capabilities. It is unlikely that one central service system will be able to adequately service the diverse problems likely to be encountered by perhaps hundreds or thousands of computer systems depending on it for service. Calvert et al's computer system also lacked the ability to efficiently track the resolution of problems, or to request or receive problem prevention.

SUMMARY OF THE INVENTION

It is a principle object of the invention to service problems in a computer system in an efficient manner.

It is another object of the invention to have a service network of computer systems to efficiently service problems.

It is another object of the invention to build a service network for servicing problems in a computer system in an efficient manner.

It is another object of the invention to automatically enroll a computer system into a service network of computer systems.

These and other objects are accomplished by the service network disclosed herein.

A service network has several computer systems connected together. A computer system can either be a "Service Requestor" (SR), a "Service Provider" (SP), or a hybrid of the two, a "Service Provider/Requestor" (SP/R).

The service network is built by an enrollment process that adds computer systems into the service network. A SP (or SP/R acting as an SP) already in the network can initiate the enrollment of an SR (or SP/R acting as an SR) into the network. In addition, a SR (or SP/R acting as an SR) can initiate a request for enrollment into the network. If such a request is initiated, it must be approved by the receiver of the request. The request can be approved automatically or with human intervention.

BRIEF DESCRIPTION OF THE DRAWING

FIG. 1B shows a more complex service network of the invention.

FIG. 1D shows an extremely complex service network of the invention.

FIG. 3A shows the fields contained in an entry of the problem log of the invention.

FIG. 3B consisting of FIGS. $3B_1$, $3B_2$, shows the fields contained in a service request of the invention.

FIG. 3C shows the fields contained in an entry of the solution log of the invention.

FIG. 4A shows the fields contained in an entry of the entitlement database of the invention.

FIG. 4B shows the fields contained in an entry of the support database of the invention.

FIGS. 5B–5H show exemplary screens displayed during the enrollment process.

FIGS. 6B, $6C_1$, $6C_2$, 6D show exemplary screens displayed during the enrollment process.

FIGS. 20A–20D show exemplary problem tracking screens.

DESCRIPTION OF THE PREFERRED EMBODIMENT

Incorporation by Reference

This invention is related to the following patent and pending patent applications, all of which are commonly assigned and are hereby incorporated by reference:

U.S. Pat. No. 4,654,852 to Bentley et al
U.S. Pat. No. 5,237,688 to Calvert et al,
(Calvert I)
U.S. Pat. No. 5,287,505 to Calvert et al,
(Calvert II).

TABLE OF CONTENTS

I. Overview
II. Enrollment of a Computer System into a Service Network
III. Solving problems in a Service Network
IV. Tracking Problems in a Service Network
V. Problem Prevention in a Service Network

I. Overview

For the remainder of this patent application, a computer system that requests service from one or more computer systems and does not provide service to other computer systems will be called a "Service Requestor", or "SR". A computer system that provides service to one or more computer systems, but can also request service from one or more computer systems, serves a hybrid, chameleon-like role and will be called a "Service Provider/Requestor", or "SP/R". A computer system that does not request service from any computer systems but provides service to one or more computer systems will be called a "Service Provider", or "SP".

Figure 1A:
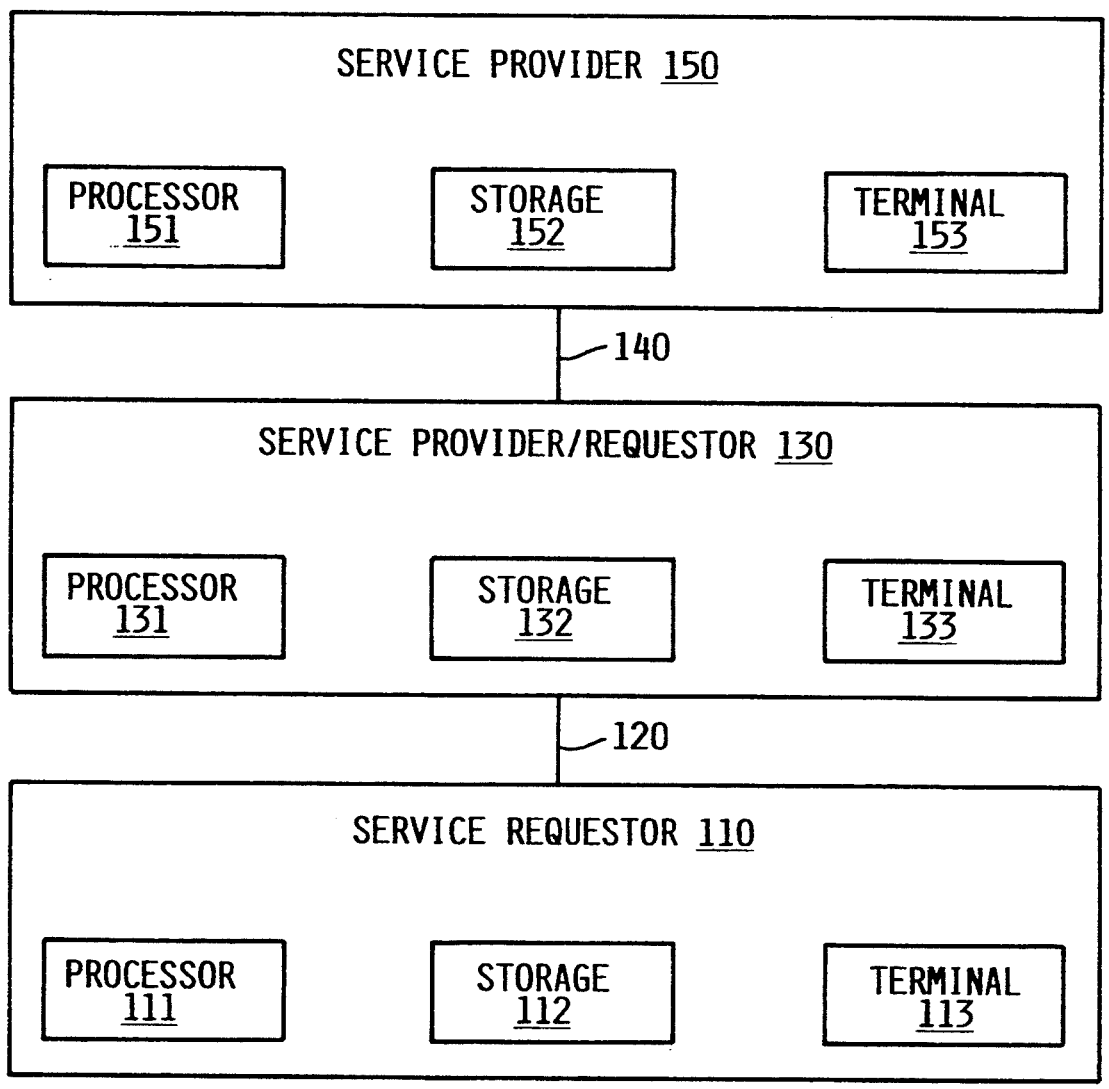
FIG. 1A shows a simplified service network of the invention.

FIG. 1A shows a simplified service network of the invention. SR 110 is connected via link 120 to SP/R 130. SP/R 130 is connected via link 140 to SP 150. In the preferred embodiment, SR 110, SP/R 130, and SP 150 are all IBM Application System/400 midrange computer systems, although any other computer systems, such as mainframe computers or personal computers, could be used. Lines 120 and 140 are normally telecommunications links such as a leased line or a public switched telephone network or other carrier, but could be a direct link, such as a wire or optical cable, or a local area network. SR 110 also includes processor 111, storage 112, and one or more terminals 113. Likewise, SP/R 130 includes processor 131, storage 132, and one or more terminals 133. SP 150 includes processor 151, storage 152, and one or more terminals 153.

FIG. 1B shows a more complex service network of the invention. Each SP/R is typically connected to several SRs. The SP/R acts as a service provider for these SRs. Each SP/R is also typically connected to several SPs. The SP/R acts as a service requestor to these SPs.

Figure 1C:
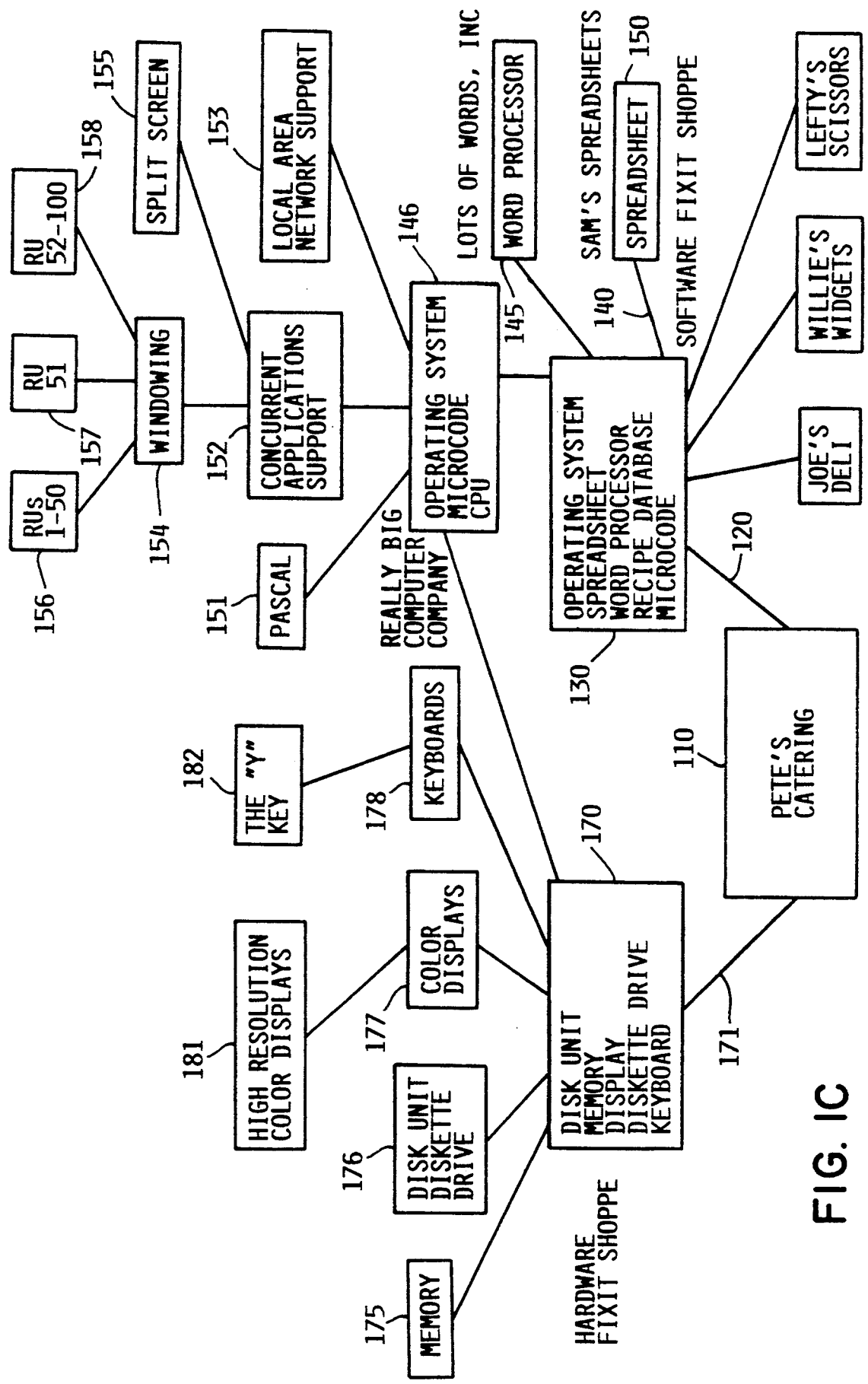
FIG. 1C shows an exemplary service network of the invention.

FIG. 1C shows an exemplary service network of the invention. Lets assume that SR 110 is a computer system for Pete's Catering Company, a hypothetical small business. SR 110 communicates over link 120 to SP/R 130, otherwise known as the Software Fixit Shoppe, a hypothetical software repair company. The Software Fixit Shoppe communicates over link 140 to SP 150, a mythical application software development company called Sam's Spreadsheets. The Software Fixit Shoppe is also connected to SP/R 146 (Really Big Computer Company), and SP 145 (Lot's of Words, Inc). SP/R 146 is further connected to SP 151, SP/R 152, and SP 153. SP/R 152 is connected to SP/R 154 and SP 155. SP/R 154 is connected to SP 156, SP 157, and SP 158.

SR 110 is also connected to SP/R 170 over link 171. SP/R 170 is also known as the Hardware Fixit Shoppe. SP/R 170 is further connected to SP 175, SP 176, SP/R 177, SP/R 178 and SP/R 146. SP/R 177 is further connected to SP 181. SP/R 178 is further connected to SP 182.

Typically, Hardware Fixit Shoppe 170 and Software Fixit Shoppe 130 would also be connected to hundreds or even thousands of service requestors like Pete's Catering 110, and could be connected to more SPs or SP/Rs than is shown in FIG. 1C.

The network of FIG. 1C is built by an enrollment process that adds computer systems into the service network. A SP (or SP/R acting as an SP) already in the network can initiate the enrollment of an SR (or SP/R acting as an SR) into the network. In addition, a SR (or SP/R acting as an SR) can initiate a request for enrollment into the network. If such a request is initiated, it must be approved by the receiver of the request.

Once the network shown in FIG. 1C is established, Pete's Catering computer system can automatically detect problems with it's components (hardware, software, or microcode), build a service request describing the problem, select a SP/R responsible for fixing the problem, (either the Hardware Fixit Shoppe or the Software Fixit Shoppe) and send the service request to that SP/R. The SP/R responsible for fixing the problem receives the service request, verifies that Pete's Catering is entitled to receive service, and checks a solution log to see if it has the solution for the problem. If so, solution information describing the fix for the problem, accompanied by one or more software components, microcode components, hardware parts order, and/or textual instructions, is sent down to the SR. If the responsible SP or SP/R cannot fix the problem, it checks to see if it receives support for this problem from any other SPs or SP/Rs to which it is connected. If so, it sends the service request on to this SP or SP/R. This process continues until a fix for the problem is found.

For example, let's assume that Pete's computer system has discovered a problem with one component (also referred to as a field replaceable unit, FRU, replaceable unit, RU, module or object) of its spreadsheet application program. It determines that the Software Fixit Shoppe is responsible for fixing this component, so it builds a service request and sends it to the Software Fixit Shoppe. The computer system at the Software Fixit Shoppe verifies that Pete's Catering is entitled to receive service, and checks a solution log to see if it has the solution for the problem. It can't find a solution for the problem, so it checks to see if it receives support for this component from any other SPs or SP/Rs to which it is connected. It discovers that Sam's Spreadsheets is supposed to support problems with spreadsheet application components, so it sends the service request on to Sam's. The computer system at Sam's receives the request, searches its solution log for a solution, and finds a solution. It sends the solution information down to the Software Fixit Shoppe, which sends it down to Pete's. Sam's solution information is then stored in a solution log at the Software Fixit Shoppe. The solution information is also accompanied by a replacement software component to be used instead of the component of the spreadsheet program that caused the problem.

Sam's solution information is stored in a solution log at the Software Fixit Shoppe. This means that if another service requestor supported by the Software Fixit Shoppe sends a service request to the Software Fixit Shoppe with the same problem, the Software Fixit Shoppe can send the fix for the problem directly to the requestor without having to forward the service request on to Sam's Spreadsheets.

The status of the resolution of the problem can be monitored by the computer systems of the support network of FIG. 1C. Each SR, SP/R, and SP contains a problem log to track the status of each problem. Problems can have a status of OPEN, READY, PREPARED, SENT, ANSWERED, FIXED, VERIFIED and CLOSED. The problem log present in each computer system makes it possible for status of the network to be easily monitored. The monitoring activity can be user queried via a series of screens or by graphically displaying a pictorial representation of the network or a portion of the network on a console associated with a computer system of the network. For example, a console (special terminal used by a network operator) at the Software Fixit Shoppe can graphically display all SRs that it supports. When the service request is received from Pete's Catering, the icon representing Pete's may flash or change color to indicate that a service request has been received. The appearance of the icon may change again when the service request is forwarded on to Sam's Spreadsheets, again when the solution information is received from Sam's, and again when it is sent down to Pete's.

A system can also send an advisory to other computer systems to notify them of problems for which they do not have support responsibility.

The computer systems in the service network of the invention also have the capability to perform or request problem prevention. A SP (or SP/R acting as a SP) can check to see if it has any solutions to problems that one or more of the SRs (or SP/R acting as an SR) it supports has but has not discovered or reported yet. If so, it can distribute solution information, accompanied by one or more software components, microcode components, hardware parts order, and/or textual instructions, to the SRs. In addition, a SR (or SP/R acting as an SR) can request any known fixes to problems for a list of supported components from an SP (or SP/R acting as an SP). The SP sends any fixes to problems associated with the list of supported components to the requesting SR.

For example, lets assume that the Software Fixit Shoppe, after receiving the fix from Sam's for the faulty software component of the spreadsheet program, wants to perform problem prevention on the other SRs it supports that has this spreadsheet program but hasn't reported or discovered this problem yet. It determines who these SRs are and sends the solution information to them, along with the replacement software component.

FIG. 1D shows an extremely complex service network of the invention. The computer systems can be arranged in several levels. SRs can request service from one or more SPs and/or SP/Rs. SP/Rs can support one or more SRs, and can in turn request service from one or more SPs and/or SP/Rs. SPs can support one or more SRs or SP/Rs. Even one pair of SP/Rs can request service from each other.

Figure 2A:
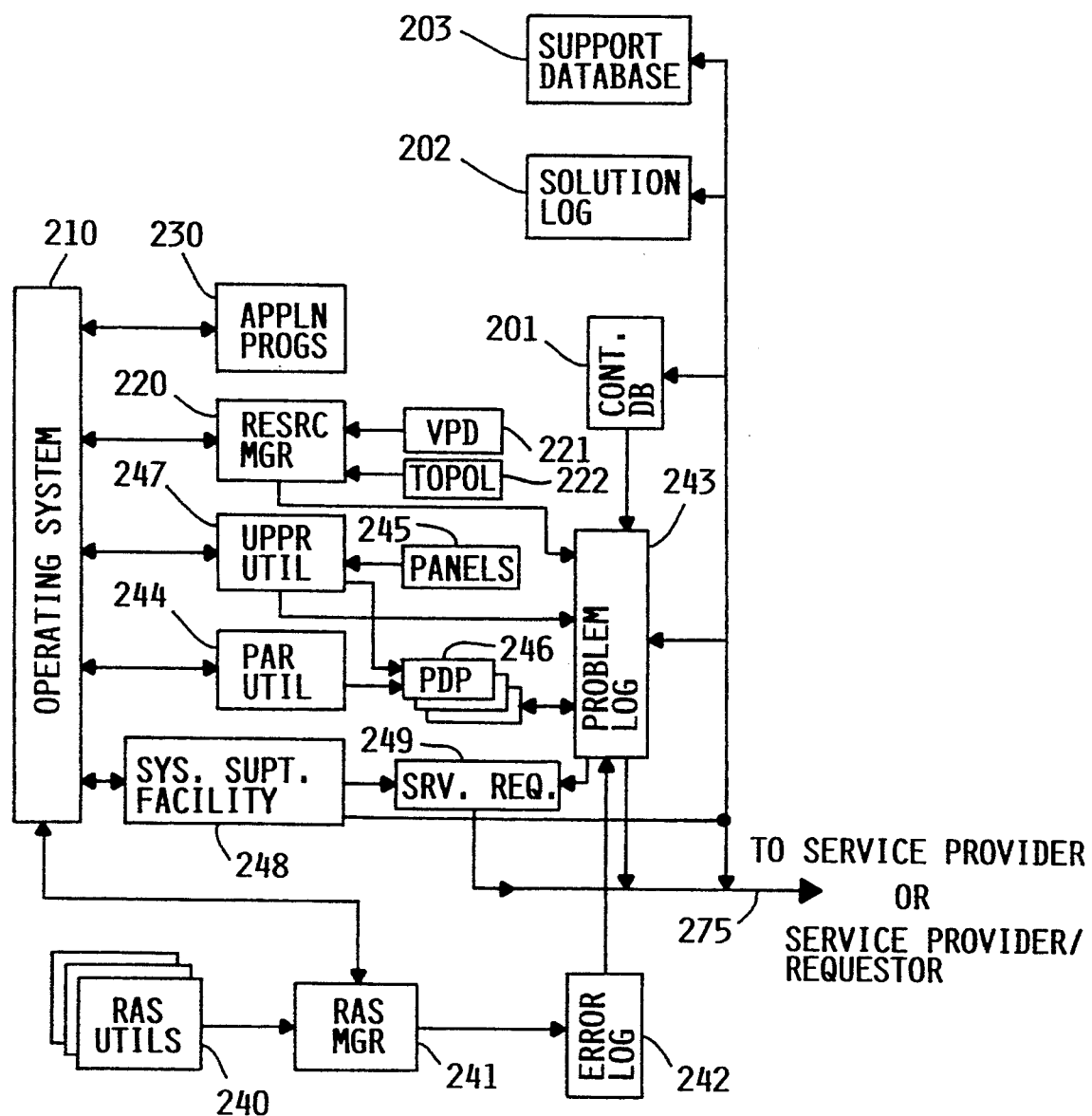
FIG. 2A shows a block diagram of a service requestor of the invention.

FIG. 2A shows Service Requestor 110 of FIG. 1A in more detail. The executable elements of FIG. 2A are performed by processor 111, suitably programmed as indicated in the appropriate flowcharts.

Operating system program 210 may be of any type, but preferably has the conventional capability of executing a number of programs concurrently such as the Operating System/400. A resource manager (RM) program 220 maintains vital product data (VPD) information from a VPD table 221 identifying the hardware components (types, models, serial numbers) and the software components (product numbers, release levels, PTFs installed); some of this data is actually collected by RAS manager 241. The RM program also maintains a topology file 222 which describes the interconnections of the components of the SR.

Application programs 230 of any conventional type are executed by operating system (OS) 210 under any conventional management technique, such as a job queue (not shown). The operating system runs RM program 220 at bring-up (IPL) time, as one job among the application programs 230.

A suite of service utilities include most of the elements used by the invention.

The subsystems of the SR all have resident event-driven reliability and serviceability (RAS) utility programs which detect any errors occurring during operation of their subsystem. For example, an I/O processor in a disk subsystem such as 112, FIG. 1, may have a utility 240 running as an interrupt routine whenever the I/O processor issues an interrupt resulting from an error; they may also run as notifiable tasks. An error may occur when an operation produces a known invalid result, times out, fails to start, produces a stuck fault in a bus line, etc. A reliability and serviceability (RAS) manager 241 is event-driven by utilities 240 while the customer system is running. Rather than running at the level of a job under OS 220, RAS manager 241 preferably executes as an event-driven task in microcode. Raw error data collected by the RAS manager is kept in an error log 242; some of this data is later transferred to a problem log 243. Data collected from each error is recorded as an entry in the error log. The fields of each entry of the error log include:

A system log identifier, a unique key identifying this error-log entry

Failure statistics (e.g., how many times did a seek error occur before the correct cylinder was found?)

The configuration of components (from the VPD table) involved when the error occurred Device status provided by the particular RAS utility, such as register contents or status bits A reference code identifying the type of error.

Problem log 243 contains a number of entries, one for each problem encountered. (Note that an "error" is different from a "problem.") Each entry of the problem log contains fields for:

Network wide unique problem identifier

Status information

Machine information (type, serial, model, change level, network ID, control point)

Initial or point-of-failure FRU list, in order of decreasing probability

Isolation FRU list, in order of decreasing probability

Final or fix FRU list, in order of decreasing probability

Symptom string (coded reference numbers)

Solution Information (filled in when problem is answered)

Originating System Identification (network ID and control point)

Received from System Identification (network ID and control point)

Sent to System Identification (network ID and control point)

Running history of problem resolution activity that occurred and who performed this activity.

A problem-log entry may have one of eight status conditions: "open," after the entry is first built; "ready," after all applicable PDPs 246 have finished executing, "prepared," after the associated service request 249 has been stored, "sent," after the service request has been transmitted to the central service system for action, "answered," after solution information is received from a SP or SP/R, "fixed," after the solution is applied "verified," after the SR verifies that the solution information did solve the problem, and "closed," after all activity for the problem is completed.

The fields of the problem log entry are shown in FIG. 3A.

Referring again to FIG. 2A, the term "FRU" literally stands for "field replaceable unit," the smallest component of a system which will be stocked for replacement of a failing component, and is in common use in the industry. In the context of the present invention, however, the meaning of this term is expanded to refer to the smallest unit of a problem solution. Such a unit may be a hardware component as in the usual sense of the term, but may also be a software component such as a program, module, or object, or a message indicating an action to be taken to solve the problem. For example, the operator might be instructed to reset certain switches, or to summon a communications-carrier service representative.

The initial FRU list is the list of components suspected of failing by the RAS utility 240 which detected the problem; this list is derived from the error log entry written by this RAS utility. The isolation FRU list contains the components suspected by the PDPs 246; any PDP executed by PAR program 244 may write one or more FRU numbers into the isolation FRU list field in the problem-log. The service provider updates the isolated FRU list to produce a final FRU list which designates the suspected components. The FRU code numbers in each of these three lists are ordered in decreasing order of probability of failure by the program which supplies them; each item in the list also has an explicit probability number which estimates the likelihood that it is the failing unit; again, these number are provided by the designers of each component. Different fields of a problem-log entry are written at different times, and more than one entry of some fields may be written into a single entry.

A contact data base 201 contains information relating to the customer, such as the customer name and address, the name and telephone number of one or more people who are to be contacted in connection with system problems, preferred language textual instructions, and so forth.

A problem analysis and resolution (PAR) program 244 contains routines for analyzing problems received by the RAS manager and entered into the error log. When RAS manager 241 creates a new entry in error log 242, PAR program 244 may—but need not always—create a new entry in problem log 243. The system log identifier, the reference code identifying the failure, and some of the configuration data from the error log are transferred to the problem-log entry. The PAR program also selects among a number of problem determination procedures (PDPs) 246, in response to reference codes in the problem log. Briefly, PAR 244 reads the coded reference numbers from the problem-log symptom fields, and the failing-unit codes from the problem log. It then selects a particular PDP 246 and executes it. The selected PDP may interrogate further fields in the problem-log entry, optionally ask the operator of the customer system for further information (by means of a display on a terminal 113, FIG. 1), or optionally display instructions for the operator to perform certain actions that can't be done automatically, such as setting controls or plugging cables.

A user-perceived problem resolution (UPPR) program 247 allows the operator of the SP to create a problem-log entry even though the RAS manager has not detected any errors. This is done by means of display screens or panels 245 requesting information from the operator and receiving his input. The UPPR program may run certain PDPs 246 in response to data from the operator, and may also request the operator to take certain actions; it builds a symptom string and list of involved components from the PDP results and the operator information. In some cases, a PDP executed for this purpose may solve the problem; in that case, no entry is created.

Figures 1, 2B:
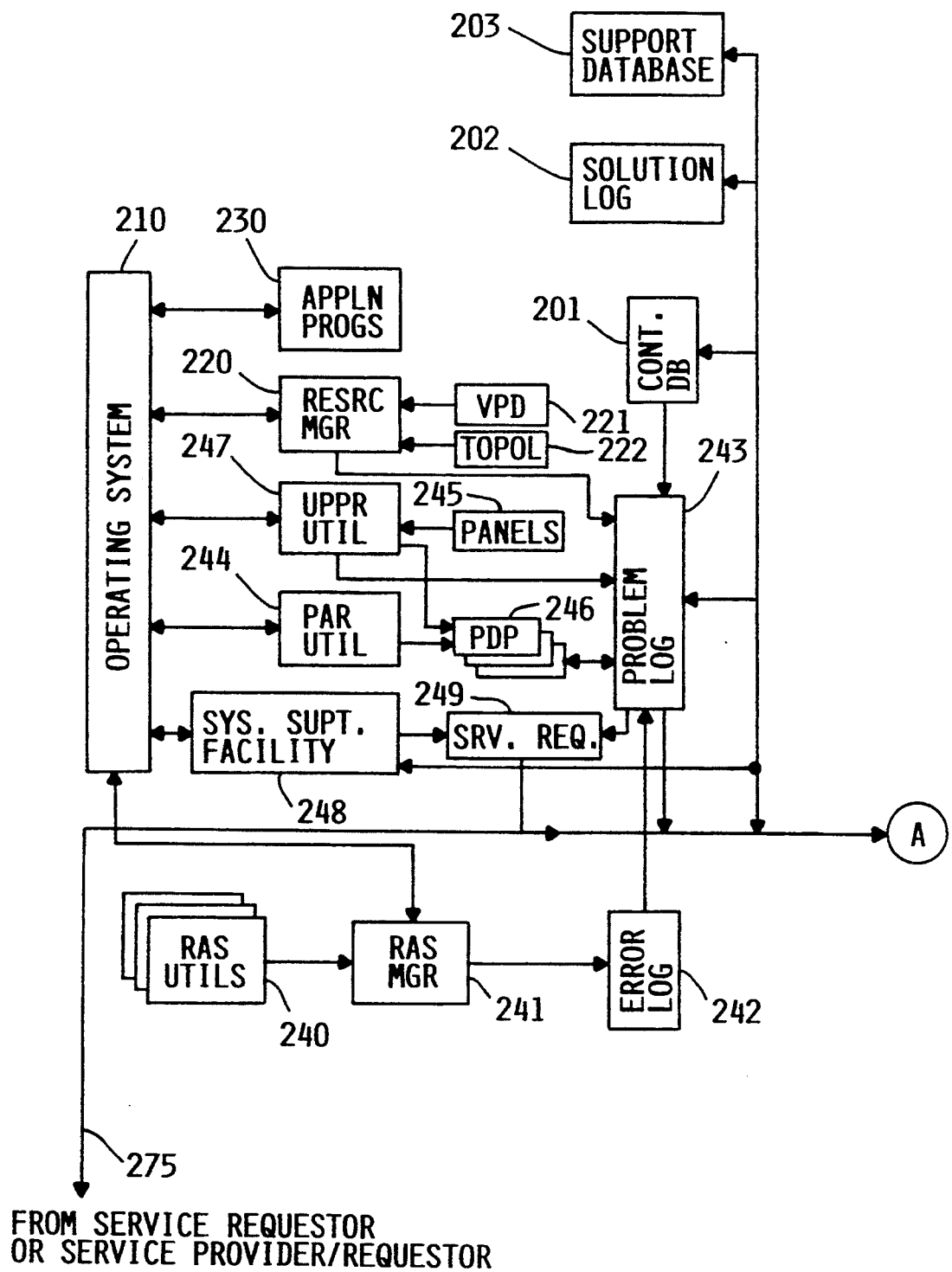
FIG. 2B shows a block diagram of a service provider/requestor of the invention.

A system support facility (SSF) program 248 converts a selected problem-log entry into a service request 249, transmits it to a SP or SP/R, such as SP/R 130 of FIG. 1, and manages the SR end of a dialog with the SP or SP/R. SSF 248 also is used to request enrollment into a service network, request problem prevention, track the status of problems, and process advisories.

Referring now to FIG. 3B, service request 249 is of the form shown in FIG. 3B1 when a SR requests that a known problem be fixed. Service request 249 is of the form shown in FIG. 3B2 when a SR requests problem prevention for a component, as will be explained in more detail in section V. A service request 249 has fields for:

Problem identifier

Customer data (name, telephone number, and address of contact person, customer language)

Machine information of machines that detected and reported problems (type, serial, model, change level, network ID, control point)

Destination ID (optional-network ID and control point of service provider that this service request should be forwarded to).

If known problem:

Problem data (problem-log number, date and time of occurrence, severity, symptom string, recurrence flags)

Initial and isolation FRU codes (i.e., part numbers of field or customer replaceable hardware and/or software components, probability estimates that these components caused the problem, key number of a message describing the problem).

Textual Problem Description (blank if automatic).

If problem prevention:

Problem prevention type identifier

Component ID.

Recurrence flags are set to indicate that the same component has previously reported a problem within a certain time period (e.g., 30 days), and that the same symptoms had previously occurred within the time period. The severity code is a number assigned by the operator or system to indicate how serious the problem is believed to be.

The symptom string is a series of codes reformatted from the results of problem detection and subsequent problem analysis.

Referring again to FIG. 2A, solution log 202 keeps track of the configuration changes of SR 110. As shown in FIG. 3C, solution log 202 has the following fields:

Network ID and Control Point
Component ID
Version/release level
Solution information (identifies one or more hardware, software, or microcode components)
Solution status (for each component identified above)
Symptom string
Requisites (indicates if solution should be sent for problem prevention requests).

Referring again to FIG. 2A, support database 203 keeps track of which SP or SP/R is responsible for supporting a component of the SR's computer system. As shown in FIG. 4B, support database 203 has the following fields:

Component ID
Network ID of SP or SP/R
Control point
Automatic Install Information
Problem Prevention Information.

SR 110 of FIG. 2A communicates with an SP/R or SP via link 275.

Figures 2, 2B:
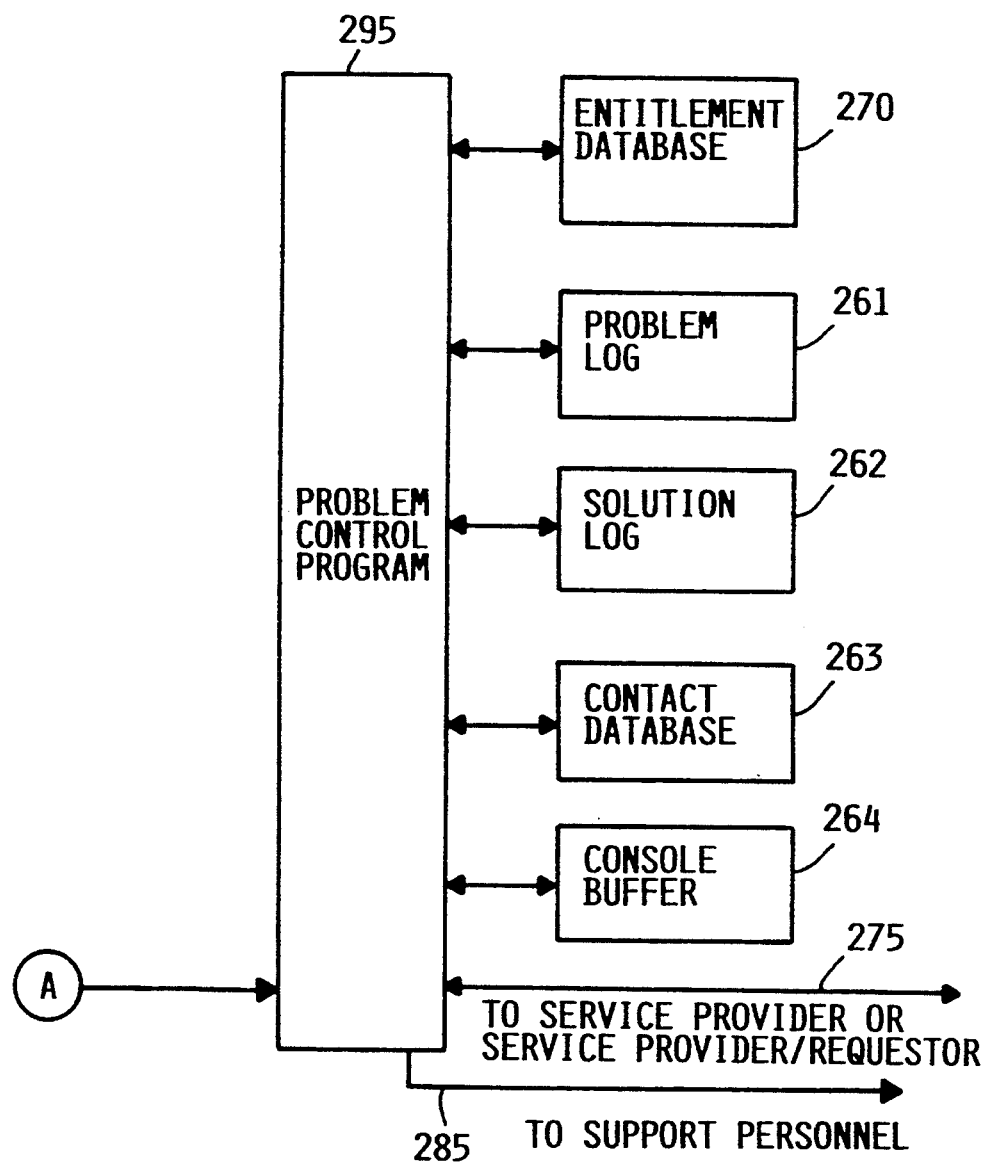
Figure 2C:
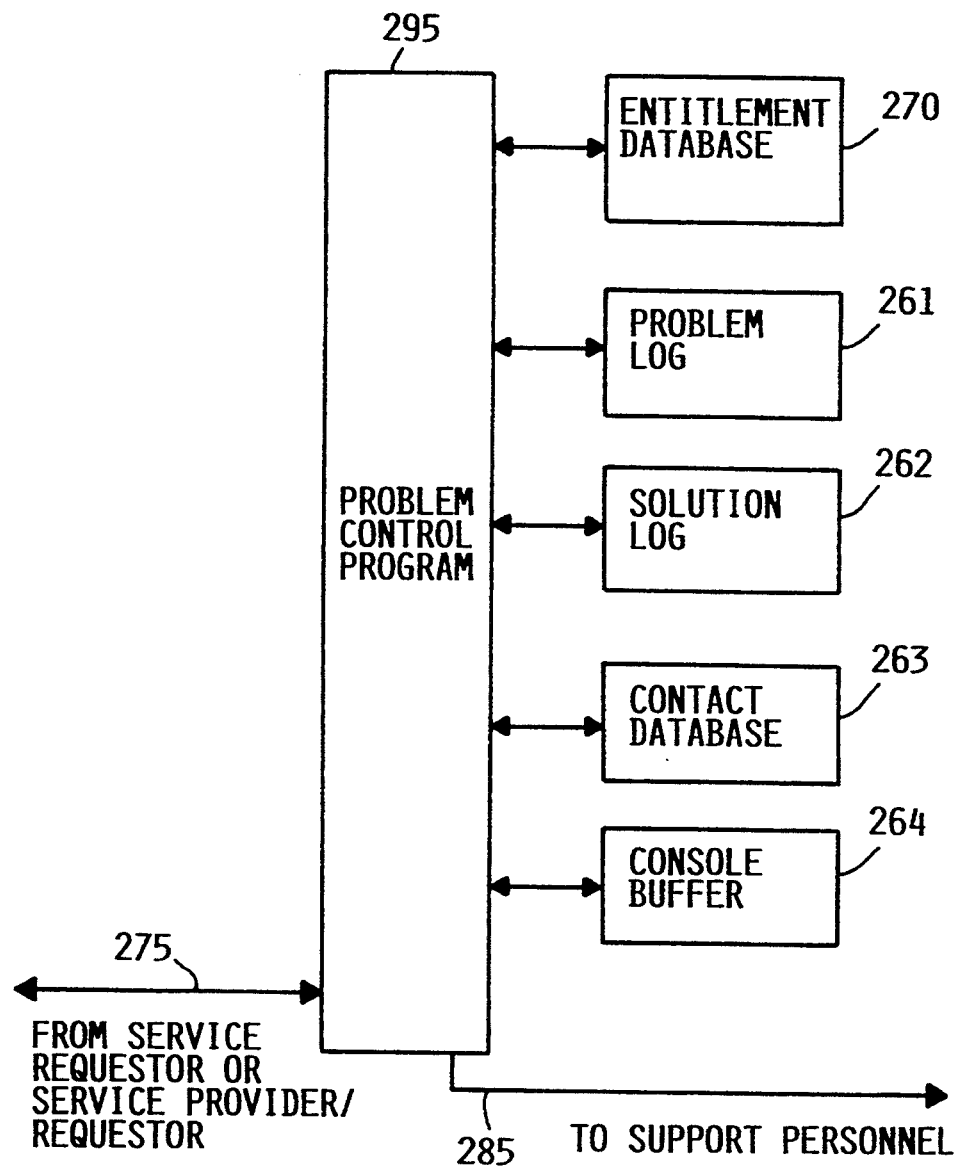
FIG. 2C shows a block diagram of a service provider of the invention.

FIG. 2C shows a block diagram of SP 150 of the invention.

Problem control program 295 manages the dialog with the SR or SP/R, handles enrollment and problem prevention requests, tracks the status of problems, and processes advisories. Problem control program 295 is performed by processors 131 or 150, suitably programmed as indicated in the appropriate flowcharts. Problem control program 295 accesses problem log 261, solution log 262, and contact database 263. Each of the preceding are of the same format as discussed with SR 110 of FIG. 2C, but contain information about all the SPs and SP/Rs supported by SP 150. Problem control program 29 communicates with other SP/Rs and/or SRs via link 275. Problem control program 295 notifies service personnel of problems it supports but can't fix via link 285. SP 150 also has console buffer 264 for controlling the information presented at the console, as will be discussed in section IV.

SP 150 also has entitlement database 270. Entitlement database 270 keeps track of what support SRs or SP/Rs are entitled to receive. Entitlement database 270 is shown in more detail in FIG. 4A and contains the following fields:

Client Description Data (such as that shown in FIG. 5E)
System Type
System Serial Number
Network ID
Control Point (to uniquely identify SR or SP/R)
Entitlement Status (enrolled or not enrolled)
Entitled Component ID list.

FIG. 2B shows a block diagram of SP/R 130 of the invention. SP/R combines the elements of SR 110, already discussed, with the elements of an SP 150, also already discussed. Note that problem log 261, solution log 262, and contact database 263 contain information about all SRs and SP/Rs that SP/R 130 supports; problem log 243, solution log 202, and contact database 201 only contain information about SP/R 130.

II. Enrollment of a Computer System into a Service Network

Figure 5A:
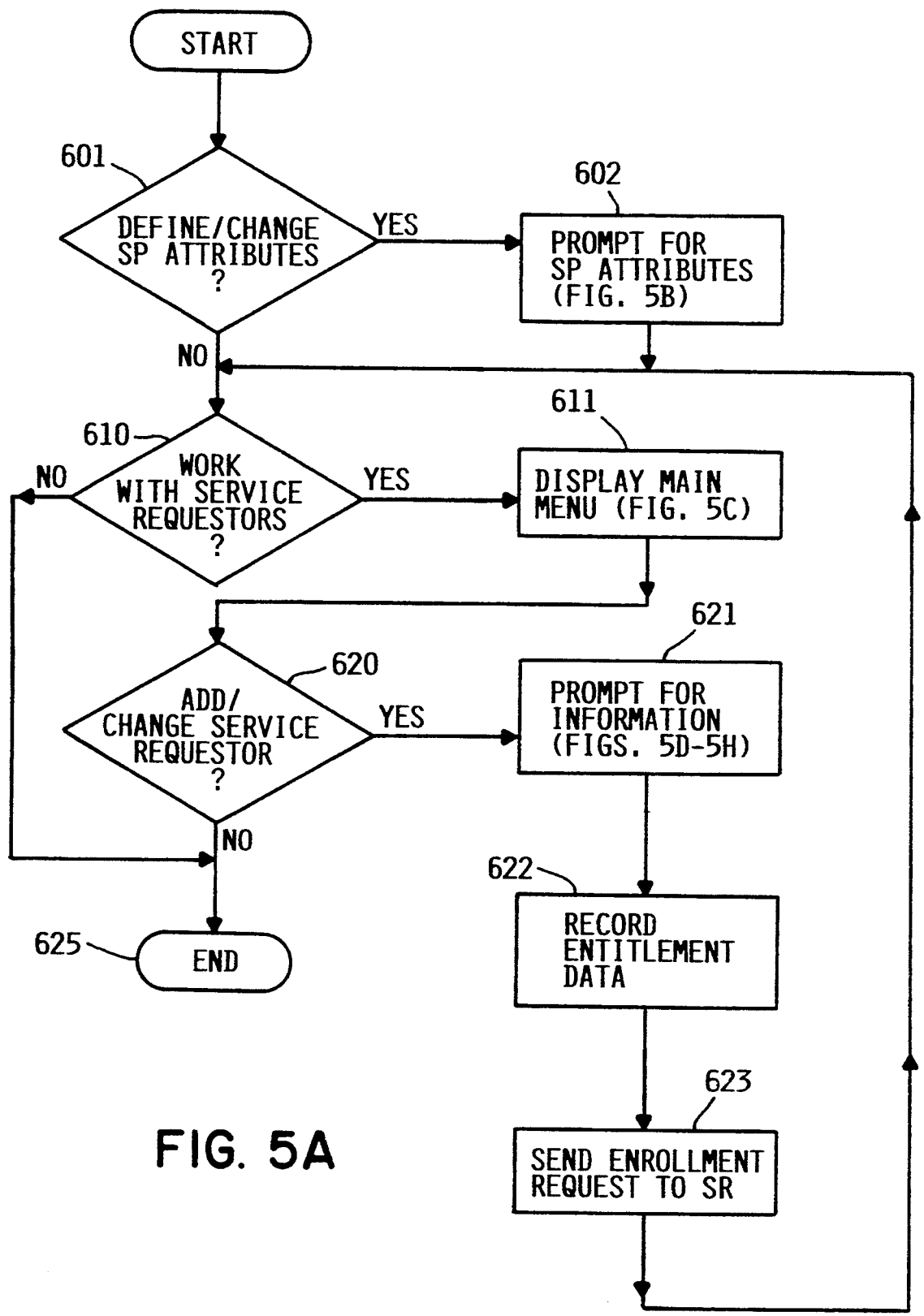
FIG. 5A shows a flowchart of the enrollment of a service requestor into a service network by a service provider.

FIG. 5A shows a flowchart of the enrollment of a service requestor into a service network by a service provider. This flowchart is performed by processor 131 or 151 of SP/R 130 or SP 150 (FIG. 1), by problem control program 295 (FIGS. 2B and 2C). As an example, lets assume that our service network consists of the Software Fixit Shoppe as a SP/R, providing service to SRs known as Joe's Deli, Willie's Wigets, and Lefty's Scissors (FIG. 1C). The Software Fixit Shoppe wants to enroll Pete's Catering as a SR into the service network. Block 601 checks to see if SP attributes need to be defined or changed. For the purposes of this and subsequent flowcharts, "SR" will refer both to an SR and a SP/R acting as an SR. "SP" will refer to both a SP and a SP/R acting as an SP.

If block 601 is answered affirmatively, the operator at the SP is prompted with attribute information to change, as shown in FIGS. 5B. The attribute information of FIG. 5B is the default attribute information for all SRs the SP supports—it can be overridden on a case by case basis for specific SRs, as shown in FIG. 5E.

Block 610 asks if the operator wants to work with service requestors. If so, Block 611 displays the main menu, as shown in FIG. 5C. The main menu shows that Joe's Deli, Willie's Wigets, and Lefty's Scissors are already enrolled as SRs in the network. The operator selects option 1 to add Pete's Catering, thereby answering block 620 affirmatively and displaying the screens shown in FIGS. 5D–5H. The operator inputs customer information about Pete's in FIG. 5D, changes any of the default attributes in FIG. 5E, and adds a list of components for which Pete's is entitled to receive service in FIG. 5F. A "component" is defined as a replaceable unit or group of replaceable units of hardware, software, or microcode. For hardware, a component could be an entire keyboard or the "Y" key itself. For software, a component can be an entire application program, operating system, or other type of program that may itself be a combination of other programs. A component could also be a very small portion of a program, such as an object or module, or any larger portion. The Calvert II patent application referenced above shows a software packing architecture where a program is made up of several hierarchically arranged levels of replaceable units (RU). A component can be anything from one RU on the OCG level, to one RU on the SFG level and its associated RUs on the OCG level, to an RU on the AG level and all RUs beneath it in the hierarchial structure. FIG. 5G allows the operator to select components to support from a list of available but currently unsupported components. FIG. 5H allows the operator to specify which language is associated with each component that is entitled to service.

Once all the desired information is inputted into these screens, block 622 (FIG. 5A) records an entitlement entry in entitlement database 270. Block 623 sends the enrollment request to the SR. Flow of control returns to block 610, which checks to see if there are other SRs to work with. If not, the program ends in block 625.

Figure 6A:
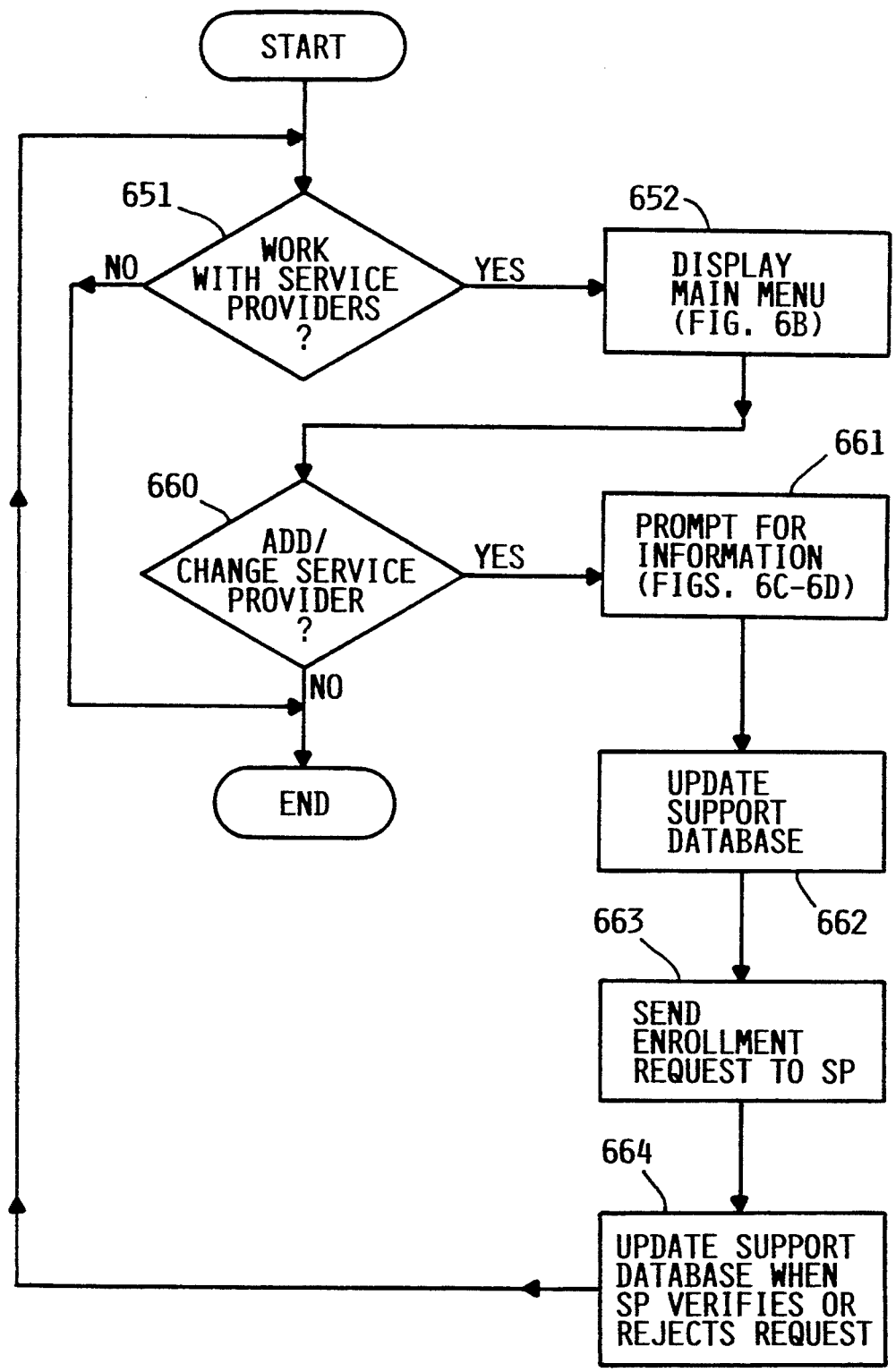
FIG. 6A shows a flowchart of the enrollment of a service provider into a service network by a service requestor.

FIG. 6A shows a flowchart of the enrollment of a service provider into a service network by a service requestor. This flowchart is performed by processor 111 or 131 of SR 110 or SP/R 130 (FIG. 1), by SSF 248 (FIGS. 2B and 2C). Returning now to our example service network, Pete's Catering now has support for his operating system, spreadsheet program, word processor, recipe database, and microcode from the Software Fixit Shoppe, but desires someone to support his hardware components. Therefore, Pete wants to request enrollment of the Hardware Fixit Shoppe as a service provider. Block 651 asks if the operator wants to work with SPs. If so, block 652 displays the main menu, as shown in FIG. 6B. The main menu shows that the Software Fixit Shoppe is already enrolled as an SP. Pete selects option 1 to add a SP, thereby answering block 660 affirmatively. Block 661 prompts the operator for information by displaying screens shown in FIG. 6C and FIG. 6D. FIG. 6C1 prompts the operator for contact information about the SP. FIG. 6C2 prompts the operator for service attributes. FIG. 6D prompts the operator for the list of components for which support is requested.

After the necessary information is provided, block 662 creates an entry in support database 203. This entry indicates that support has been requested but is not yet approved. Block 663 sends the enrollment request to the SP. The enrollment request contains the list of requested components, along with identification information about the SR.

Note that a SP/R may request that a component be supported even if the component is not installed or even present on the SP/R system. An SP/R may have one or more SRs that look to it for support. The component for which service is requested may be installed on one or more of the SR systems but not the SP/R system requesting service on the component during the enrollment request.

Figure 7:
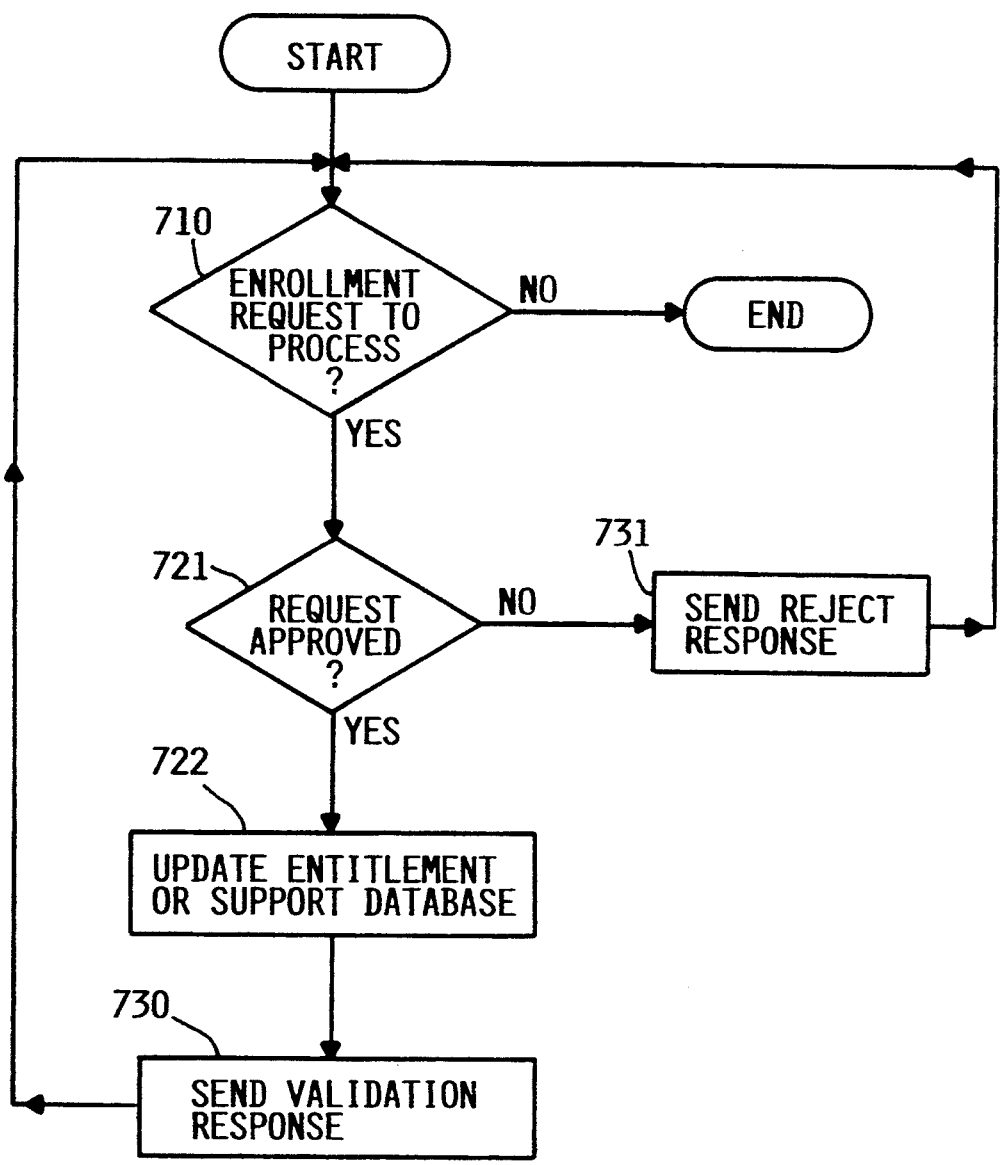
FIG. 7 shows how the enrollment process shown in FIGS. 5A and 6A are approved.

FIG. 7 shows how the enrollment process shown in FIGS. 5A and 6A are approved. This flowchart is performed by processor 111, 131, or 151 of SR 110, SP/R 130, or SP 150 (FIG. 1), by SSF 248 or problem control program 295. (FIG. 2). Block 710 checks to see if there is an enrollment request to process. If so, block 721 asks if the request is approved. This is normally done manually by sending a message to an operator asking for approval of the component list. Approval could also be done automatically by checking the entitlement database for information already entered in block 622 of FIG. 5A, (in the case of a SP approving a request from a SR) or by checking the support database for information already entered in block 662 of FIG. 6A (in the case of a SR approving a request to enroll it from a SP). For example, a SP may have already prepared an entry in its entitlement database containing all the information about a specific SR and a component list, but with an enrollment status of "not enrolled". If this was done, a matching enrollment request received from that SR can be approved automatically, and the status of the entry changed to be "enrolled".

For those components that are approved, block 722 updates entitlement database 270 or support database 203, and sends a validation response back to the SR or SP in block 730. The SR or SP receives the validation response and updates its support or entitlement database to indicate that the enrollment request has been approved. For those components not approved, a reject response is sent in block 731. The SR or SP receives the reject response and updates its support or entitlement database to indicate that the support has been rejected for these components.

The remainder of our example service network of FIG. 1C is built in the same manner as discussed above.

III. Solving problems in a Hierarchial Service Network

FIGS. 8–12 show how problems are detected, determined, and reported either by a service requestor or for a service requestor remotely by a service provider. These flowcharts are executed by processors 111, and 131 of SR 110, and SP/R 130, (FIG. 1A) by elements Resource Manager 220, UPPR utility 247, PAR utility 244, SSF 248, RAS utilities 240, RAS Manager 241, and PDPs 246 (FIGS. 2A and 2B). For purposes of this discussion, SP 150 is considered to have the elements of SP/R 130 as shown in FIG. 2B if remote problem detection and determination is to be performed.

Figure 9:
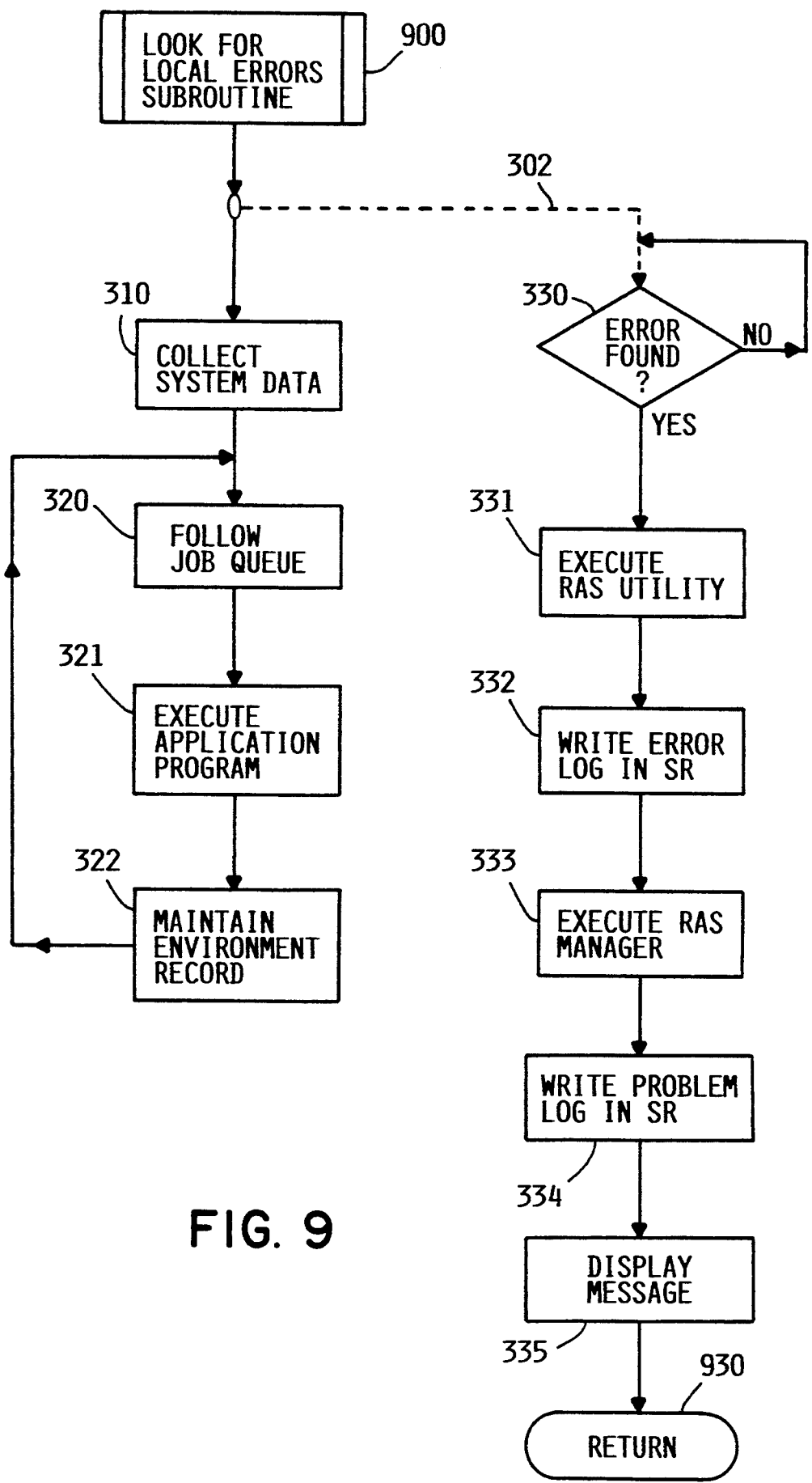

Block 801, if answered affirmatively, looks for errors on a local system by calling subroutine 900 of FIG. 9. Referring now to FIG. 9, OS 210 causes RM program 220, using RAS manager 241, to collect system data at block 310. As described in the above-mentioned patent applications, hardware and software components of system 110 contain within themselves "vital product data" (VPD) which can be read out to identify their part numbers, engineering-change levels, program-code levels, and so forth. This data includes a type number, model number, and serial number for the system as a whole and/or for a component. The RM program reads VPD information from each component, and stores it in a VPD table. This table is stored with a system resource manager (SRM) data base or topology file describing how the components are connected together; this data may be derived from a conventional configuration program (not shown) executed whenever the SR System is reconfigured or expanded.

Operating system 210 then follows a conventional job queue 320 to execute system tasks. Some of these tasks may run concurrently with other tasks in the queue. As each task is executed, OS 210 maintains an environment record 322 describing the task being run and the state of the system.

During this time, as represented by the dotted line 302, the RAS utilities 240, FIG. 2, are capable of executing within there own subset of the system. Whenever an error condition occurs within a component, block 330 causes the appropriate RAS utility to execute at block 331. When the utility determines the nature of the error, by reading status bits, performing tests, etc., it writes an entry in the error log at block 332. Error-log entries have been described in connection with FIG. 2. The FRU list derived from the error-log entry is a series of codes with attendant probabilities that the associated FRU (that is, a hardware or software component, or a message code designating an action to be taken) actually did cause the error. Control then returns to block 330 in the utility which had written the error-log entry. Whenever a utility has written an entry in the error log, the event-driven RAS manager 241 executes at block 333.

Figure 10A:
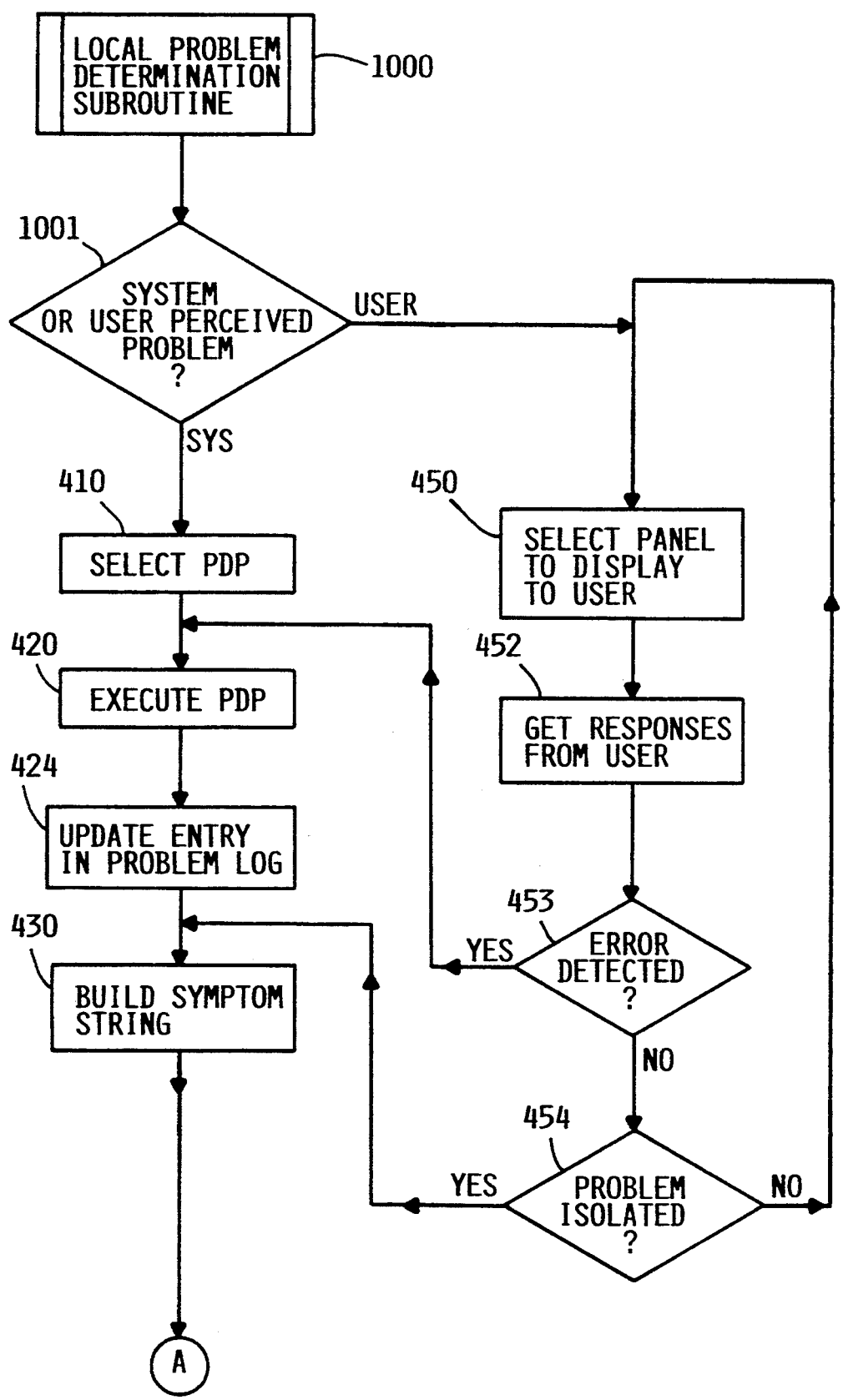
Figure 10B:
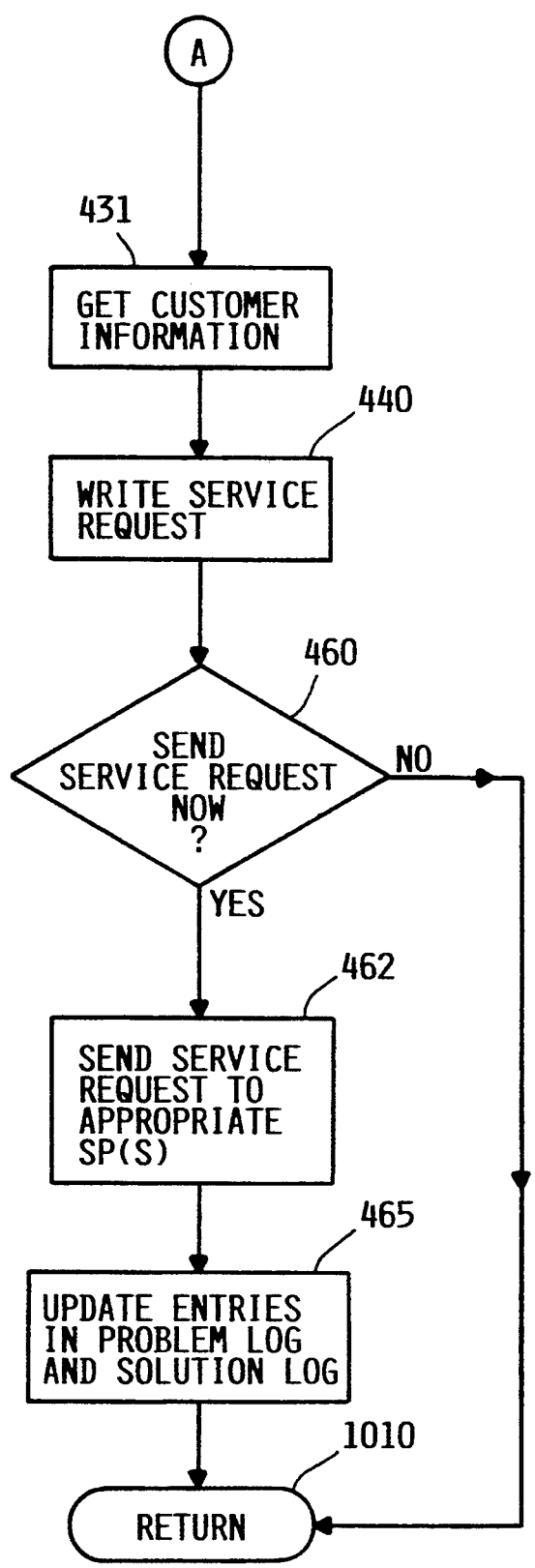

If the error is significant, (error cannot be corrected by the subset of the system) block 334 creates a new entry in the problem log, and writes into this record the data described in connection with FIG. 2, including the initial FRU list, obtained from the error log. Because no diagnosis or other analysis has yet been performed, this initial FRU list is usually longer than the isolation FRU list yet to be written in the problem log. Block 335 then accesses a message (using a conventional language-selection utility in the system) and displays it to the system operator on his terminal 113, FIG. 1. The subroutine returns in block 930 to block 810 of FIG. 8. If errors were found, block 810 is answered affirmatively and subroutine 1000 of FIG. 10 is called. Referring now to FIG. 10, block 1001 checks to see if the problem was reported by the system or by the user. If reported by the user, this subroutine is entered directly in response to a command entered by the user at terminal 113—otherwise, it is entered through block 810 of FIG. 8 being answered affirmatively.

If detected by the system, control then proceeds to block 410, where the PAR program 244 selects a particular PD procedure 246 according to the codes in the initial FRU list of the selected (or the first) problem. The selected PD procedure 246 executes at block 420. PDPs have access to the configuration data of the system, and they can cause other PDPs to execute, as indicated at 420. The explicit result of a PDP is one or more codes specifying a FRU, along with a failure probability. PDPs are diagnostic routines employing decision trees controlled by the results of tests and/or operator input.

Block 424 writes into the problem-log entry the results of the tests performed by the selected PD procedure. More specifically, the isolation FRU list field of the problem-log entry receives reference codes representing the most probable failing FRUs, along with a code designating the identity and the exit point of the last PDP to execute. Block 425 writes into the problem-log entry certain VPD codes relevant to the problem, such as the model and serial number of the customer system. The status of the problem-log entry changes to "ready" at this time.

Block 430 converts the isolation FRU list from the problem-log entry into a symptom string by selecting the most likely failure(s) from the isolation FRU list, reformatting them, and the code indicating the PDP identity and exit point. Block 431 obtains customer information, either from contact data base 201, FIG. 2, or from the operator, should he decide to override the data-base information. This information includes the name and telephone number of the person to contact at the customer site, and also includes a severity code for the problem. This code is optionally assigned by the operator to indicate the urgency for resolving the problem. The operator may also optionally write a textual description of the problem to be included in the service request at this point. Block 440 then writes the actual service request into the problem-log entry, according to the format described in connection with FIG. 2 and shown in FIG. 3B. (If the request comes from the UPPR process rather than from PAR, the FRU list is in the form of a sequence of key words, rather than numeric reference codes, however.) At this point, the status of the problem-log entry is "prepared."

It is possible that the operator may decide that the SR has a problem even though it has not itself detected any problem. If this happens, he selects this user-perceived problem resolution (UPPR) process by another command or function key at his terminal (FIG. 1A).

In this case, block 450 selects and displays a panel requesting certain information from the operator. Block 452 accepts input data and formats the operator's responses in terms of key words, and writes them to a symptom string in the isolated FRU list field of a newly-created problem-log entry for this problem. Block 453 detects any system problem occurring during the UPPR process. If a problem is detected, control shifts automatically to the PAR process executes block 420. If no error is detected, control passes from block 453 to block 454, to see if the problem is sufficiently isolated. If not, control returns to block 450, which then selects another screen, based upon the key words generated by responses to previous screens. The screens displayed by block 450 may request certain actions, ask questions about the system, and display advisory information. When block 454 determines that the problem has been sufficiently isolated, control passes to block 430 and the process continues as before.

Block 460 determines if the service request should be sent now or not. If the problem detection and determination process has been automatic up until this point, block 460 is normally answered affirmatively. However, it is entirely possible that the problem identified in the current problem-log entry has been solved at this time; that is, one or more actions taken by the operator in response to messages from the initial or isolation FRU lists has cured the fault in the customer system. The operator may then exit the process at block 1010. He may also exit if he decides to proceed by analyzing additional problems and sending them all at a later time, or by placing a voice call directly to a CE or product-support staff person. In that event, the service request remains in storage with a status flag set to a "prepared" status, indicating it is ready to transmit to the service system. If he elects to continue with problem resolution, or if the problem has been automatically detected and is supposed to be automatically sent, block 462 sends the service request to the SP or SPs identified in support database 280 as supporting the component suspected of failing. Normally, only one SP supports a component, but it may be desirable to receive support from many different Sps for a particular component. Block 465 updates the entry in the problem log to indicate that the problem has a status of "sent". The subroutine returns in block 1010 to block 820 of FIG. 8.

Block 820 determines whether a SP/R wants to perform remote problem detection and determination on an SR that it supports. If so, an operator at the SP/R console (which is a special one of the terminals 133 or 153 of FIG. 1A reserved for network operators) is connected remotely with the SR and is permitted to sign on to the SR computer system. Of course, the operator must have been given a user id and password to enable access on the SR system. Once connected, however, the operator at the SP can initiate the subroutines shown in FIGS. 11 and 12 to perform remote problem detection and determination.

Figure 11:
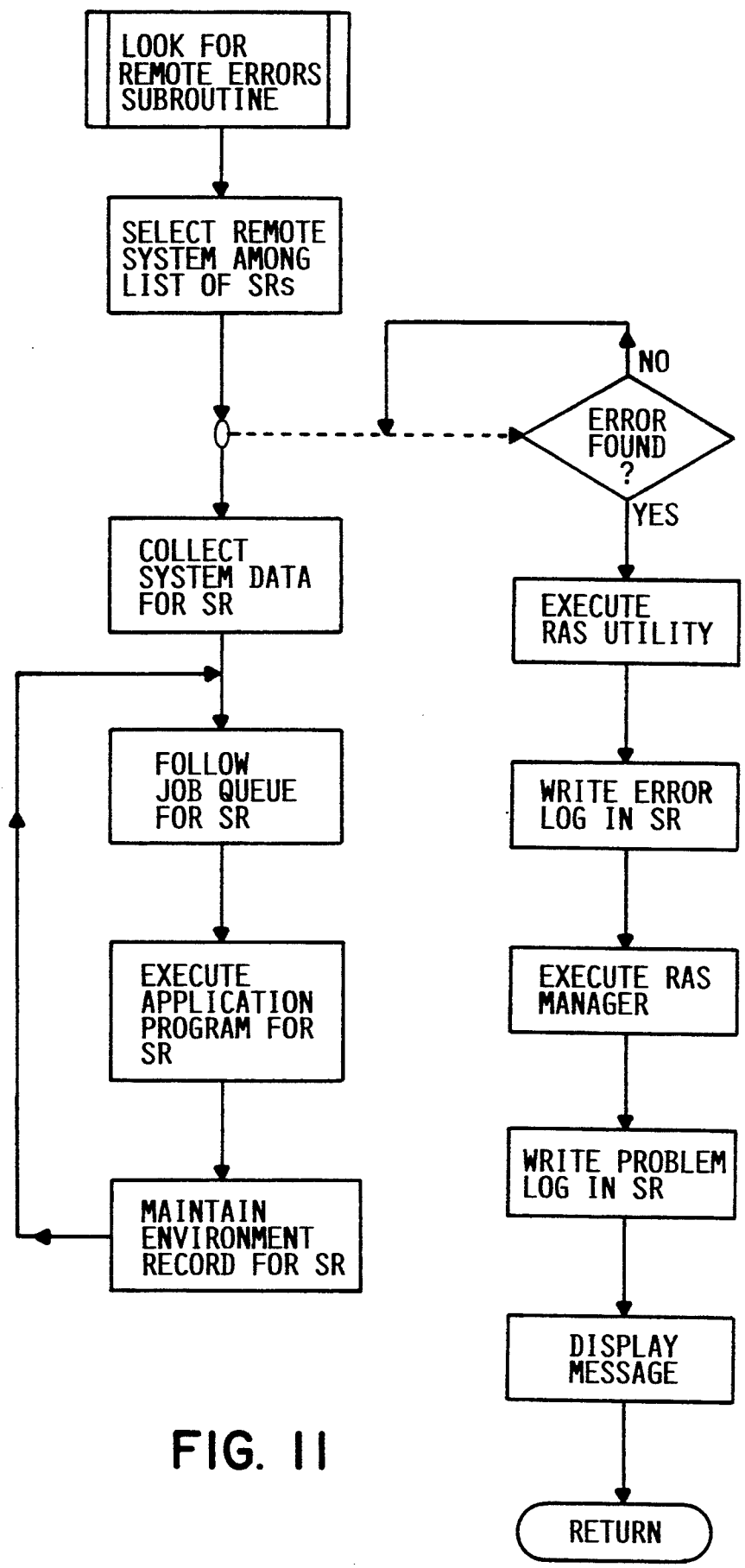
Figure 12A:
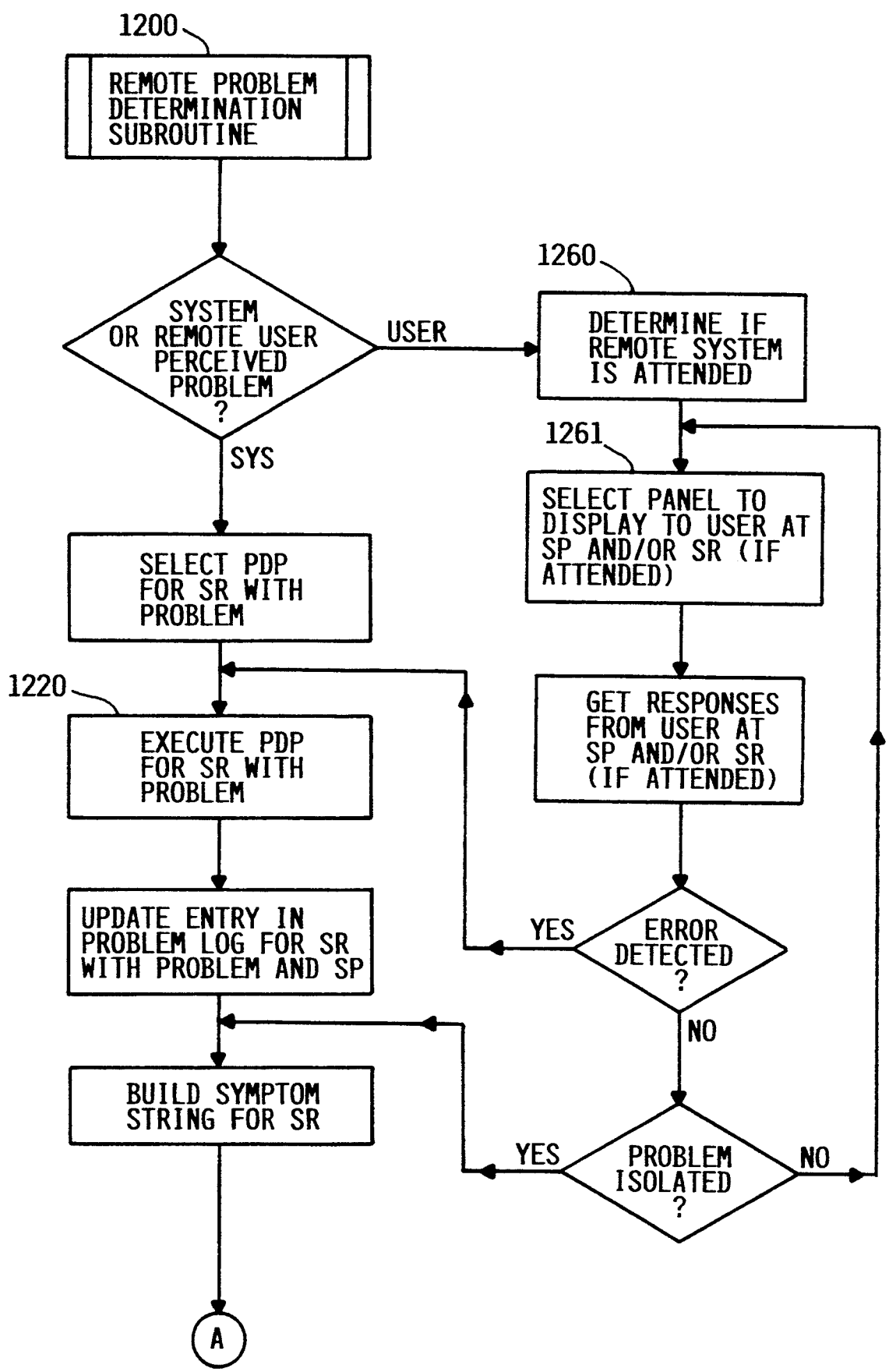

FIGS. 11 and 12 are very similar to FIGS. 9 and 10, with the following modifications.

Figures 1, 16A:
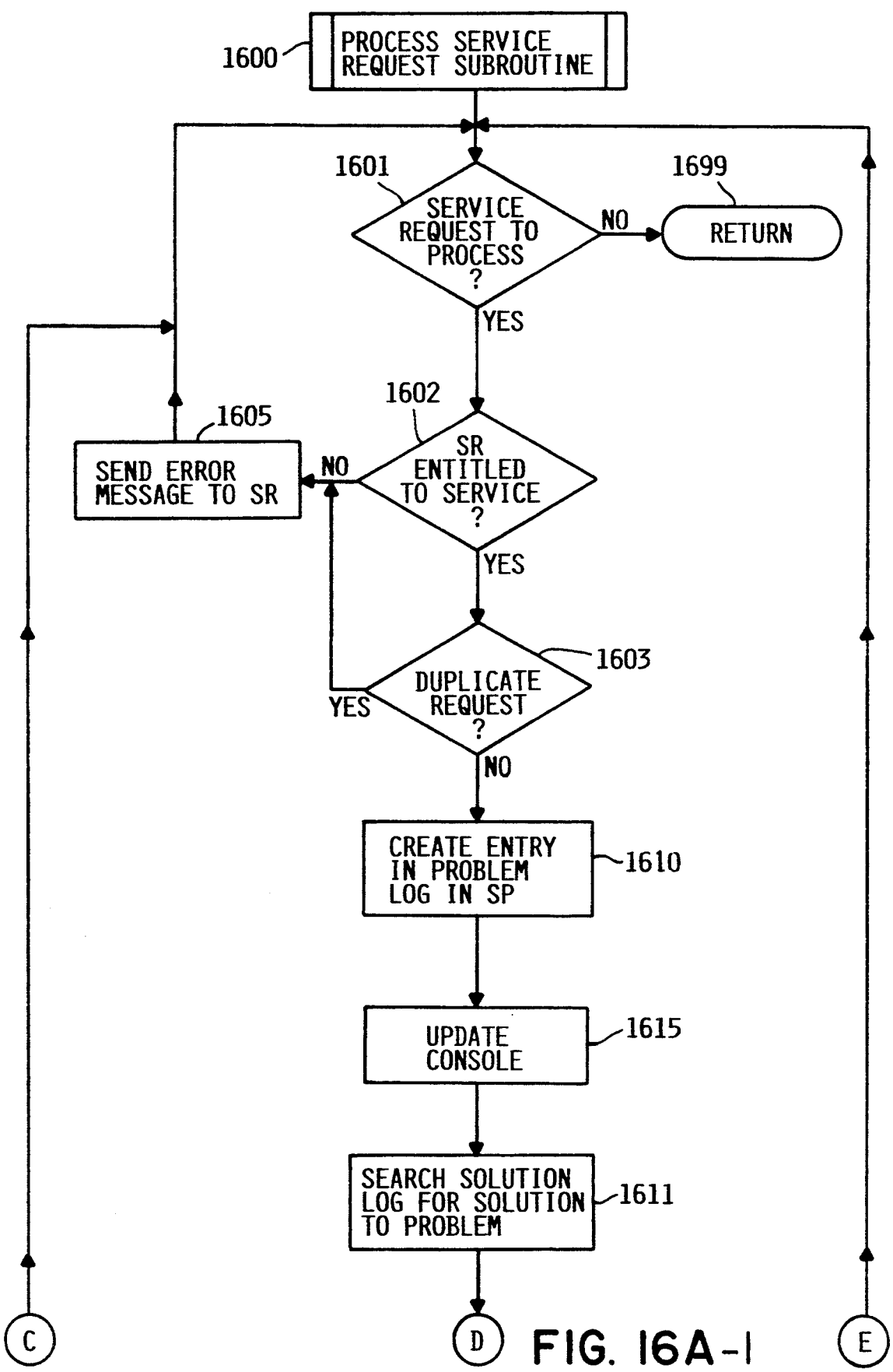
FIGS. 16A–16B show how a service provider processes service requests.

Block 1260 (FIG. 12) indicates whether an operator is available at the SR to perform tasks at the SR. If not, the panels presented at block 1261 are modified to eliminate tasks requiring an operator at the SR. Within the PDP executed at block 1220, it is determined whether an operator is present on the SR; and, if not, panels presented by the PDP, if any, are likewise modified. The absence of an operator in the SR may result in less isolation of the problem being accomplished. If a problem is detected, block 1270 extracts information from the SR normally used to prepare a service request to search its solution log for a fix (effectively skipping to block 1611 of FIG. 16A, since no service request is necessary). If a fix isn't found, the SP/R becomes a service requestor and prepares a service request for the SR with the problem in block 1275. The SP/R sends the service request to the SP(s) indicated as supporting this component in the SP/R's support database in block 1280. The subroutine returns in block 1290 to block 830 of FIG. 8. The remainder of FIG. 8 will be discussed in sections IV and V.

In the preferred embodiment, the session required to perform remote problem detection and determination is an APPC session (LU 6.2) in an APPN network, although other types of known connections, such as leased, switched or public data network, could also be used.

Figure 15:
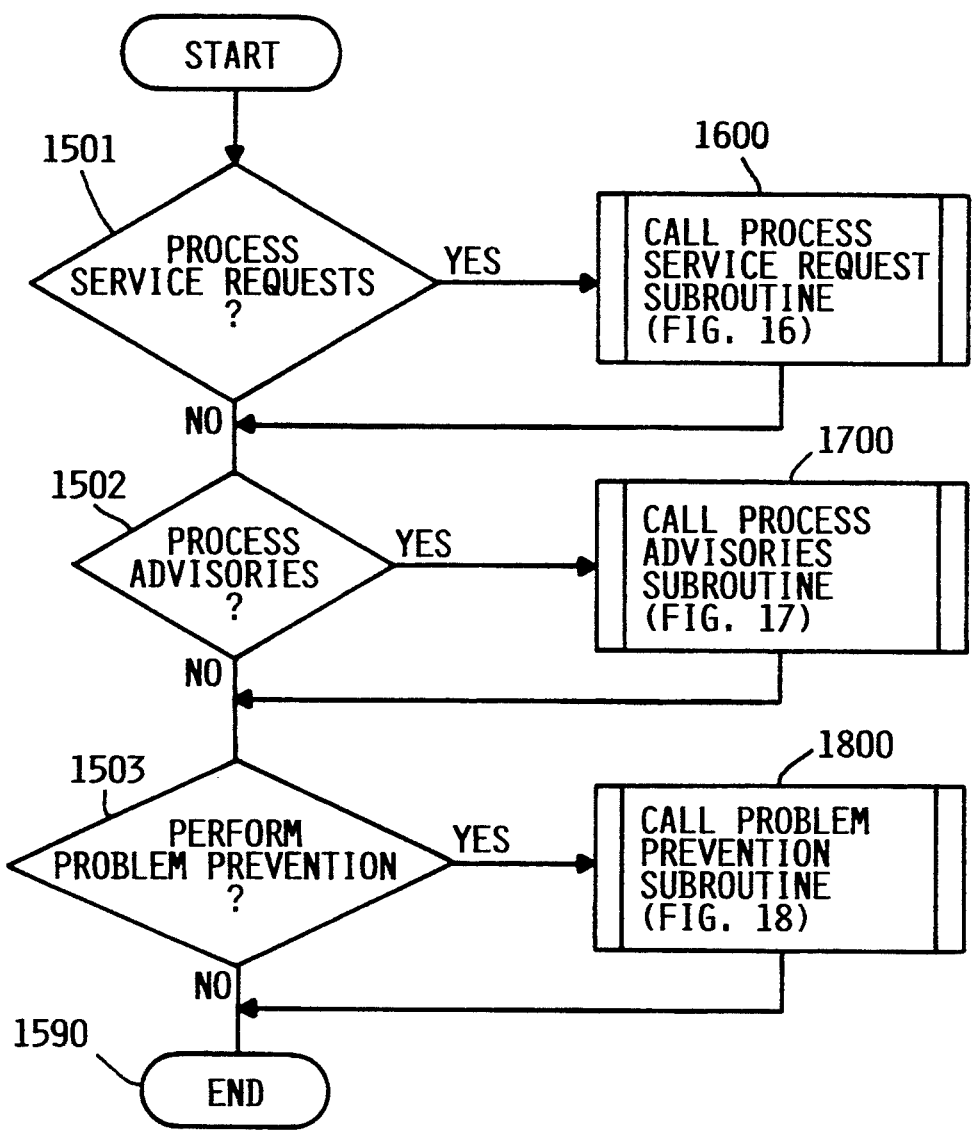
FIG. 15 shows the functions that can be performed by a service provider.
Figures 2, 16A:
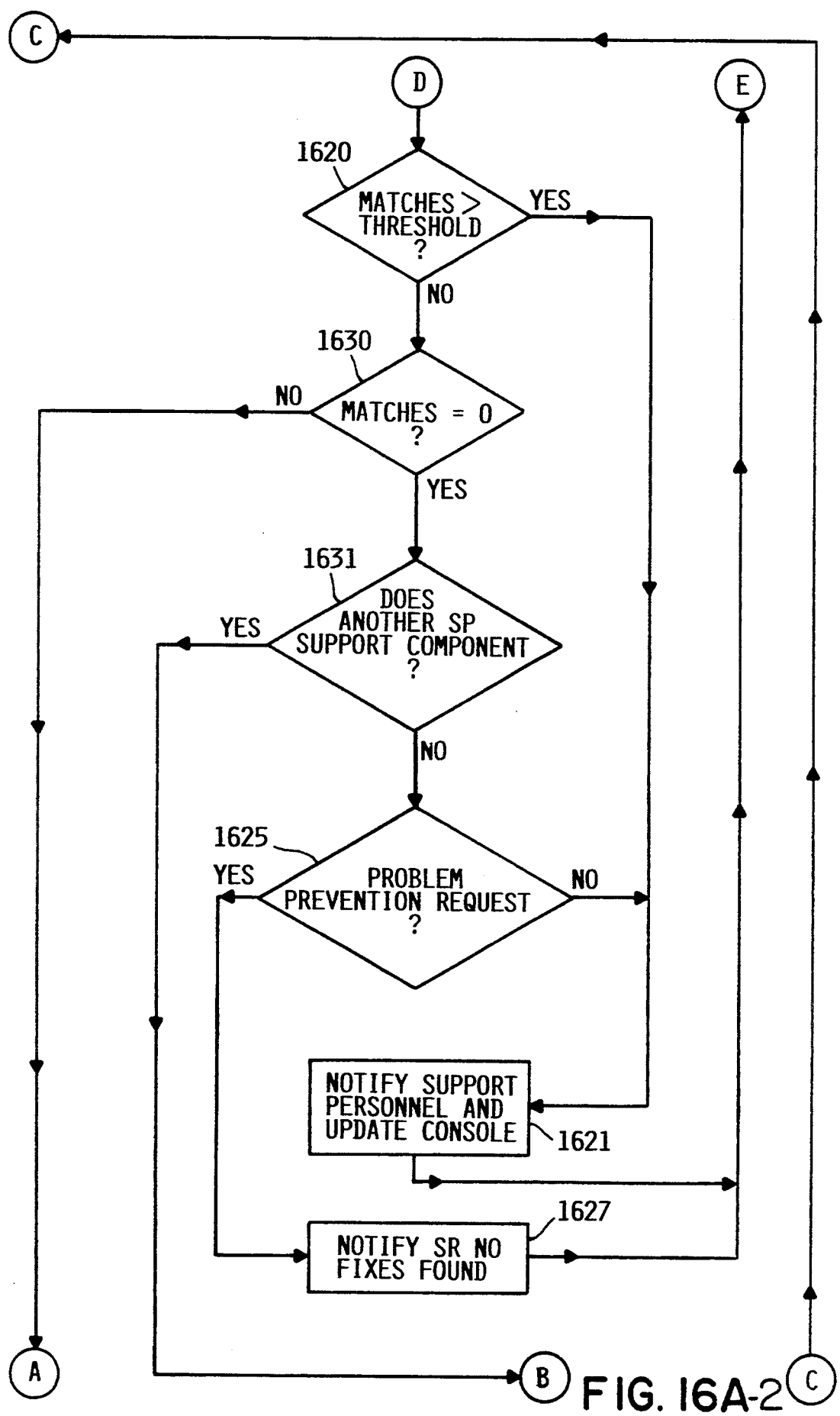
Figure 16B:
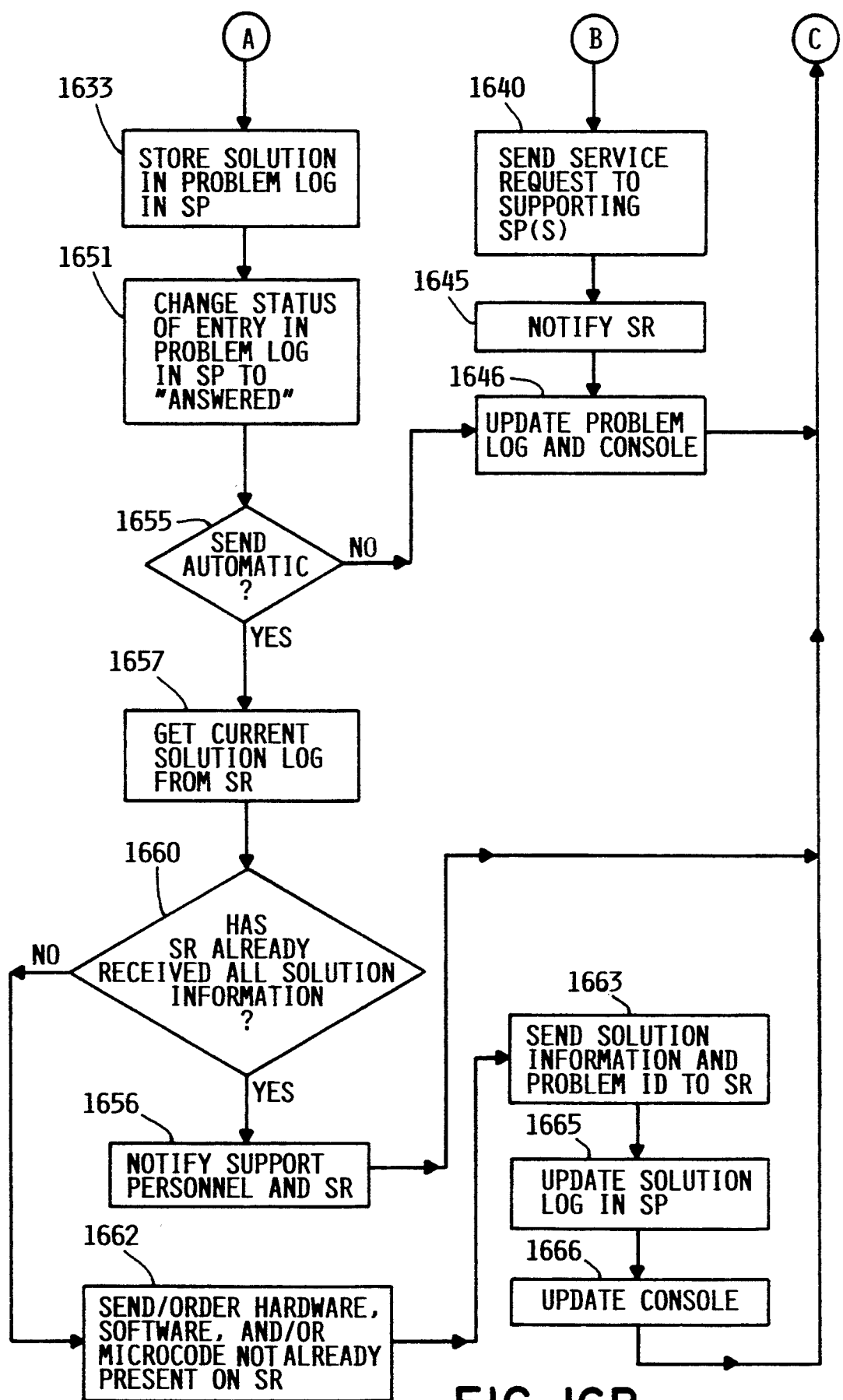

FIG. 15 shows the functions that can be performed by a service provider. This flowchart is performed by processor 131 or 151 of SP/R 130 or SP 150 (FIG. 1A), by problem control program 295 (FIGS. 2B and 2C). Block 1501 checks to see if there are any service requests to process. If so, subroutine 1600 of FIG. 16 is called. Block 1601 checks to see if there are any service requests to process. If so, block 1602 checks its entitlement database to see if the SR that sent the service request is entitled to receive service for the component suspected of failing. If not, an error message is sent to the SR in block 1605 and control returns to block 1601 to look for more service requests. If block 1602 is answered affirmatively, block 1603 checks to see if this service request was received previously from this SR. If so, block 1605 sends an error message to the SR. If not, block 1610 creates an entry in its problem log to indicate that a service request was received. Block 1615 updates the console at the SP. Block 1611 searches solution log 262 for possible solutions to the problem. Solution log 262 contains solutions for problems with hardware, software, and microcode components.

Block 1620 checks to see if the number of matches exceeds the threshold specified during the enrollment process (FIG. 5B). If so, support personnel at the SP is notified of the problem in block 1621 via link 285 so that appropriate human intervention can be performed. If not, block 1630 asks if no matches were found. If no matches were found, block 1631 checks to see if another SP supports this component. Another SP supports this component if a) the service request contains a destination ID specifying the network ID and control point of a specific service provider, or b) the support database indicates that another SP supports this component. If not, block 1625 checks to see if this service request is a problem prevention request (which will be discussed in more detail in Section V). If so, a message is sent back to the SR that no fixes for unreported problems were found. If not, the support personnel at the SP is notified of the problem in block 1621. If block 1631 is answered affirmatively, block 1640 forwards the service request to the supporting SP or SP(s) via link 275. Block 1645 then sends a message to the SR indicating that the service request has been forwarded to another SP. Block 1646 updates the status in the problem log in the SP to "SENT," and updates the console in the SP. Flow of control returns back to block 1601 to look for more service requests to process.

If block 1630 is answered negatively, a manageable number of matches were found in the solution log. Block 1633 stores the solution information, which specifies the solution for the current problem, in the problem log in the SP. The solution information may contain one or more of the following types of information:

Instructions to the operator at the SR to take some action to resolve the problem (e.g., reset a control, reconnect a cable, call a communications carrier service representative)

A list of part numbers identifying hardware components for installation by the customer or by a service representative A list of software or microcode components for resolving a software or microcode problem.

Block 1651 adds the "ANSWERED" status to the entry in the problem log in the SP. Block 1655 checks to see if the solution information is to be sent automatically by checking the information inputted into the contact database during the enrollment process. If so, block 1657 requests that the SR send a current copy of its solution log to the SP. Although the SP's solution log contains data from the SR that it is aware of, it is possible that the SP's solution log does not contain the most up to date information. This can occur if the SR received solution information from another SP, or if the SR received a component from another source not in the network.

Block 1660 compares the solution log sent from the SR with its own solution log to see if the SR has already received all of the solution information. If so, the previously sent solution information did not fix the problem, so block 1656 notifies support personnel at the SP, as well as the SR. If not, block 1662 orders hardware for the SP, sends to the SP replacement software components, and/or sends microcode components not already present on the SR. Block 1663 sends all of the solution information along with the problem ID to the SR, and updates the solution log in the SP in block 1665 to reflect the solution transmitted to the SR. Block 1666 updates the console at the SP, and flow of control returns to block 1601 to look for other service requests to process. The subroutine returns in block 1699 to block 1502 of FIG. 15.

Figure 19:
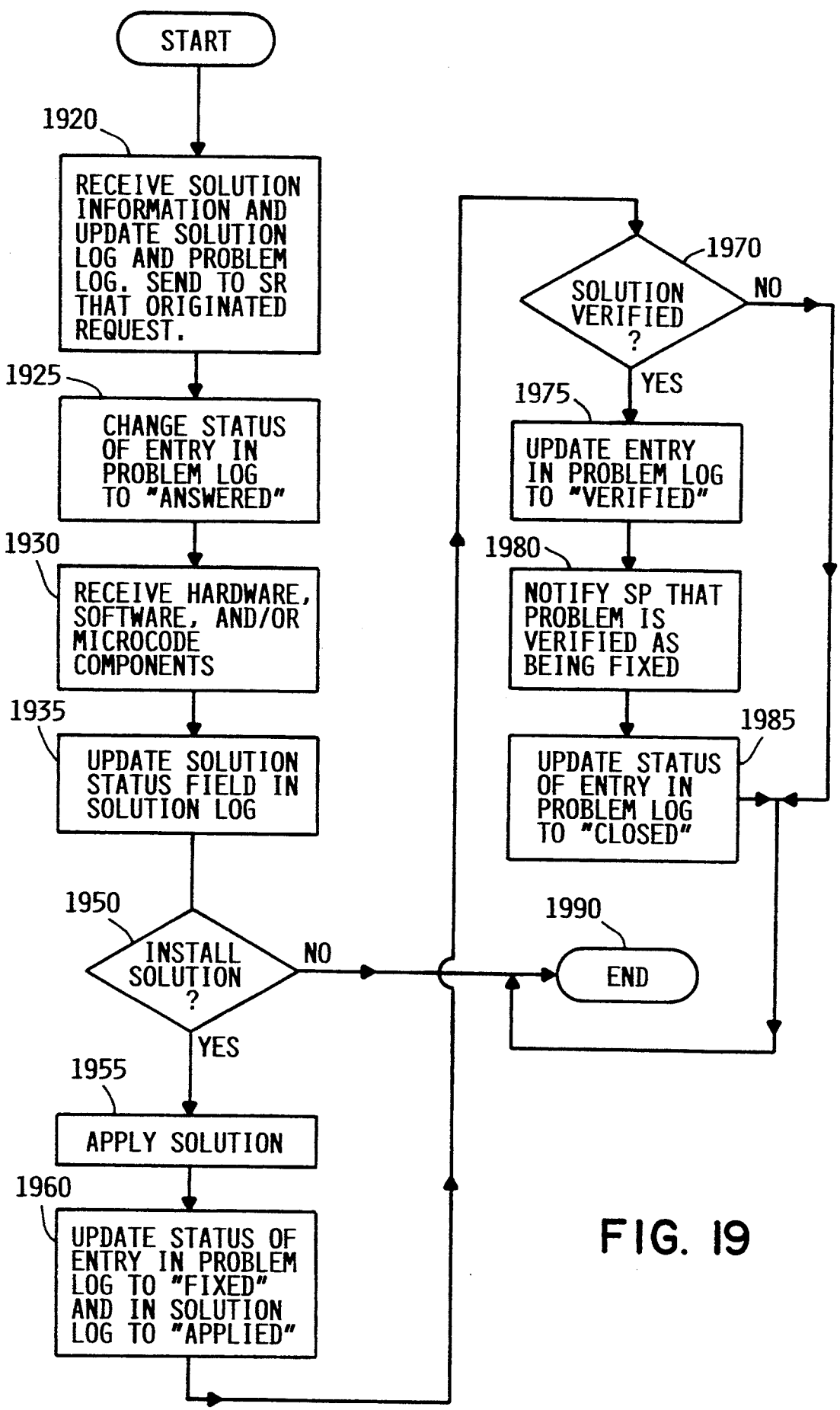
FIG. 19 shows how a service requestor processes data received from a service provider.

FIG. 19 shows the steps system support facility 248 of the SR performs when it receives the information transmitted to it in blocks 1662 and 1663. Block 1920 receives the solution information from the SP and stores the entry in its problem log corresponding to the problem ID and in its solution log. Block 1920 also checks its problem log to see if the problem ID sent with this solution information corresponds to a service request received from another SR. If so, the solution information is sent to the SR that sent the request. Block 1925 changes the status of the entry in the problem log to ANSWERED. The SR receives the hardware, software, and/or microcode components in block 1930, and updates the solution status field in the solution log in block 1935 to indicate that the hardware, software, and/or microcode has been received. The components are forwarded on to the requesting SR, if any.

Block 1950 then asks if this solution should be installed on the computer system. Block 1950 may be executed instantly or several hours or even days or weeks later. Human intervention may be desirable in making this decision, or the decision may be made based on information inputted into the automatic installation field in the support database during the enrollment process. For example, the Software Fixit Shoppe may decide to automatically install all solutions for components supported by the Really Big Computer company, but not for components supported by Sam's Spreadsheets.

If block 1950 is answered affirmatively, block 1955 applies the solution to the system, and block 1960 updates the entry in the problem log by adding the status "FIXED". Block 1960 also updates the entry in the solution log by adding the status of "APPLIED".

Block 1970 asks if the solution is verified. This block is answered affirmatively when the system has been tested and the problem that initiated the service request is no longer present. This verification process can be done automatically by restarting the problem detection flowchart of FIG. 9, or can be done manually via human intervention. Block 1970 could therefore be executed instantly or after a considerable delay. If block 1970 is answered affirmatively, block 1975 updates the problem log to add the status of "VERIFIED". Block 1980 notifies the SP that the problem has been verified so the SP can update its problem log. Block 1985 again updates the status to "CLOSED" when all activity concerning the problem is completed.

IV. Tracking Problems in a Service Network

Most problems in a service network can be tracked each time a new status is added to a problem log entry, or when a service request is sent and received. An SP will be able to track all problems for which support is requested from it in this manner. However, problems occurring on SRs for which it has not received a support request will not normally be known to the SP. An "advisory" is used to provide this additional information. An advisory can be used by any system in the service network to inform one or more other systems in the service network of a problem that occurred with another system in the service network.

Therefore, advisories can be used to supplement the status information received via service requests about other systems in the service network.

Figures 12B, 13:
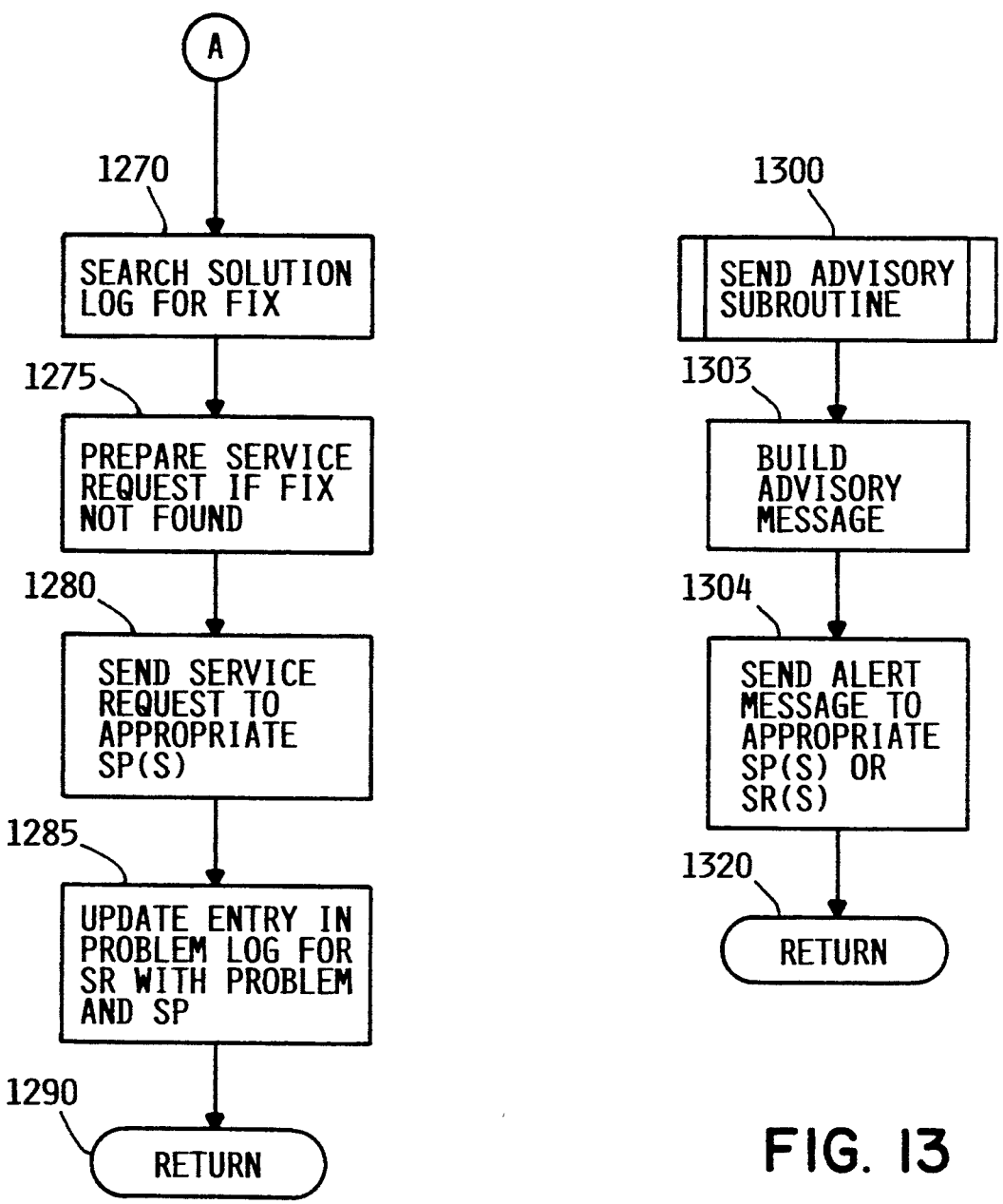
FIG. 13 shows how advisories are sent to a service provider.

Referring again to FIG. 8, block 830 checks to see if there are any advisories to send. If so, subroutine 1300 of FIG. 13 is called.

Block 1303 builds an advisory message. The advisory message contains the component ID, textual and/or encoded information about the problem and information identifying the sender of the advisory. Block 1304 sends the advisory message to appropriate SP(s) or SR(s). This is determined by checking support database 203 and/or entitlement database 270 to see which SP, SP(s), SR or SR(s) support or are entitled to receive advisories for the specified component ID. Alternatively, the component ID field may contain special broadcast data, indicating that this advisory should be sent to all SPs or SRs referred to in the support and/or entitlement databases. The subroutine returns in block 1320 to block 840 of FIG. 8. Block 840 and subroutine 1400 will be discussed later in section V.

Figure 17:
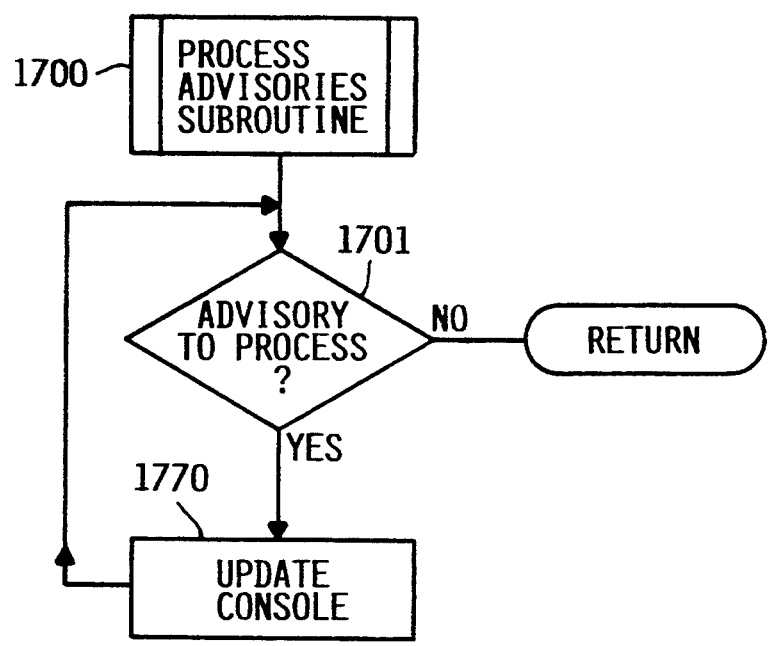
FIG. 17 shows how a service provider processes advisories.

Referring now to FIG. 15, block 1502 asks if there are advisories to process. If so, subroutine 1700 of FIG. 17 is called. Block 1701 checks to see if there are any advisories to process. If so, block 1770 updates the console to indicate the nature of the advisory received. The subroutine returns in block 1790 to block 1503 of FIG. 15. Blocks 1503 and 1800 of FIG. 15 will be discussed later in section V. Note that subroutine 1700 is also executed by SSF 248 in a SR if the SR has a console.

Through the use of advisories and service requests, in conjunction with information stored in problem logs, solution logs, and contact databases on various systems in the service network, a wealth of information is available for analysis and monitoring. For purposes of illustration, lets assume that our friend Pete of Pete's Catering is using his recipe database and can't find his favorite meat loaf recipe. He uses the flowchart shown on FIG. 10 to isolate a user reported problem and write a service request in block 440. Block 460 determines that the SP that supports fixing the recipe database is the Software Fixit Shoppe, so the service request is sent there. The Software Fixit Shoppe executes the flowchart of FIG. 16 and finds the solution to the problem in its solution log—the meat loaf recipe itself, a software component. It sends the solution information and the meat loaf recipe to Pete's and updates its problem log. Pete receives the recipe and the solution information and updates its problem log and solution logs.

System Support Facility 248 at Pete's Catering has the ability to extract information contained in its problem log to display for the operator the status of any problem at any point in time. Example screens shown to the operator at Pete's after the problem with the meat loaf recipe has been answered are shown in FIGS. 20A and 20B. FIGS. 20C and 20D show example screens shown to the operator at the Software Fixit Shoppe displaying the status of the same problem.

Figure 21:
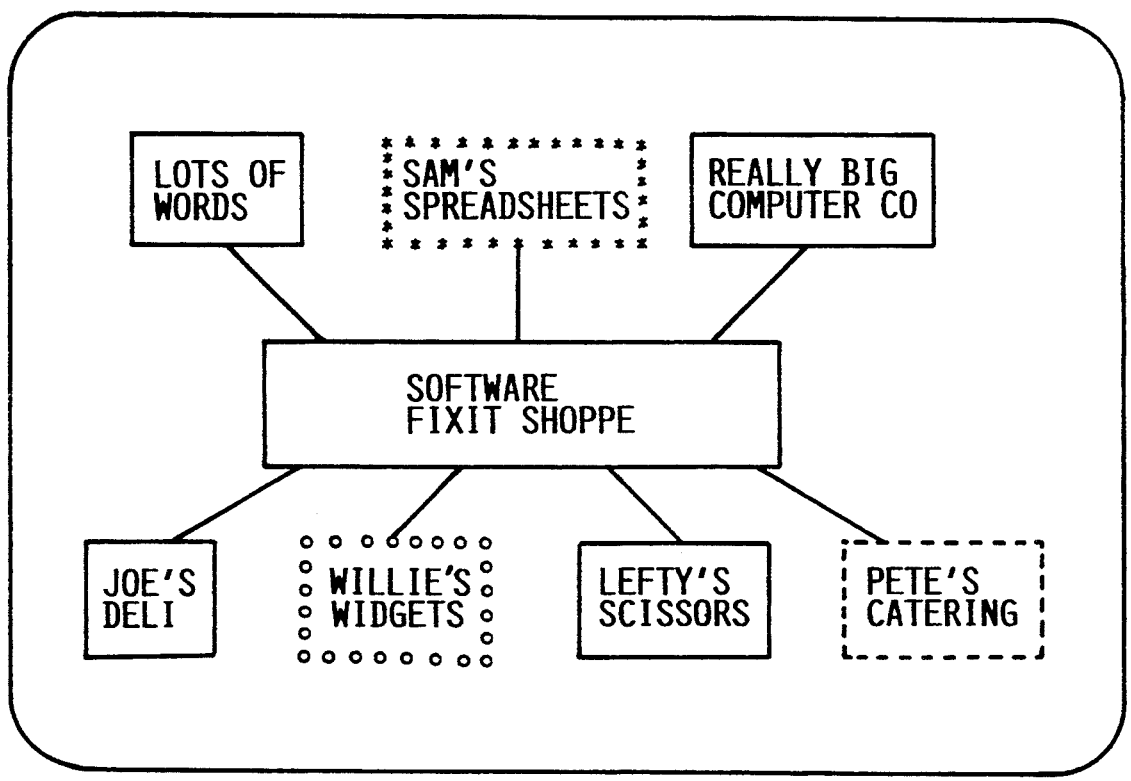
FIG. 21 shows an exemplary screen graphically displayed at a console for tracking problems.

Alternatively, a console at the Software Fixit Shoppe could be used to graphically monitor the status of the entire service network or a portion of the service network. An example of what a console at the Software Fixit Shoppe might look like after a service request is received from Pete's Catering is shown in FIG. 21. Each SR and SP in the network that the operator wants to see is displayed on the screen. Preferably, the various computer systems in the network are displayed iconically, where the icons representing the computer systems change in appearance to reflect the status of that computer system in the network. FIG. 21 shows a solid line to Pete's Catering, which is represented by a box made of dashed lines. This representation symbolizes that a service request has been received from Pete's that has not been answered yet. Joe's Deli and Lefty's Scissors are shown connected by solid lines to solid boxes. This represents that Joe's and Lefty's computer systems are up and running normally. Willie's Wigets is connected by a solid line but with a box made of dots. This represents that a problem reported earlier by Willie has been answered by the Software Fixit Shoppe.

The console at the Software Fixit Shoppe also shows that one of the SPs, Sam Spreadsheets, is represented by a box made of stars. This indicates that an advisory has just been received from Sam's. The operator can press a function key to display additional information about the advisory. The choice of representations of system status on a console is a design choice up to the designer or even the operator. If the console supported color and a variety of attributes, the icons could change color, blink, become brighter or dimmer, or otherwise change to indicate a change of status. For example, a red blinking icon could represent that a service request has been received but not answered.

V. Problem Prevention in a Service Network

A. Service Requestor Instigated

Figure 8A:
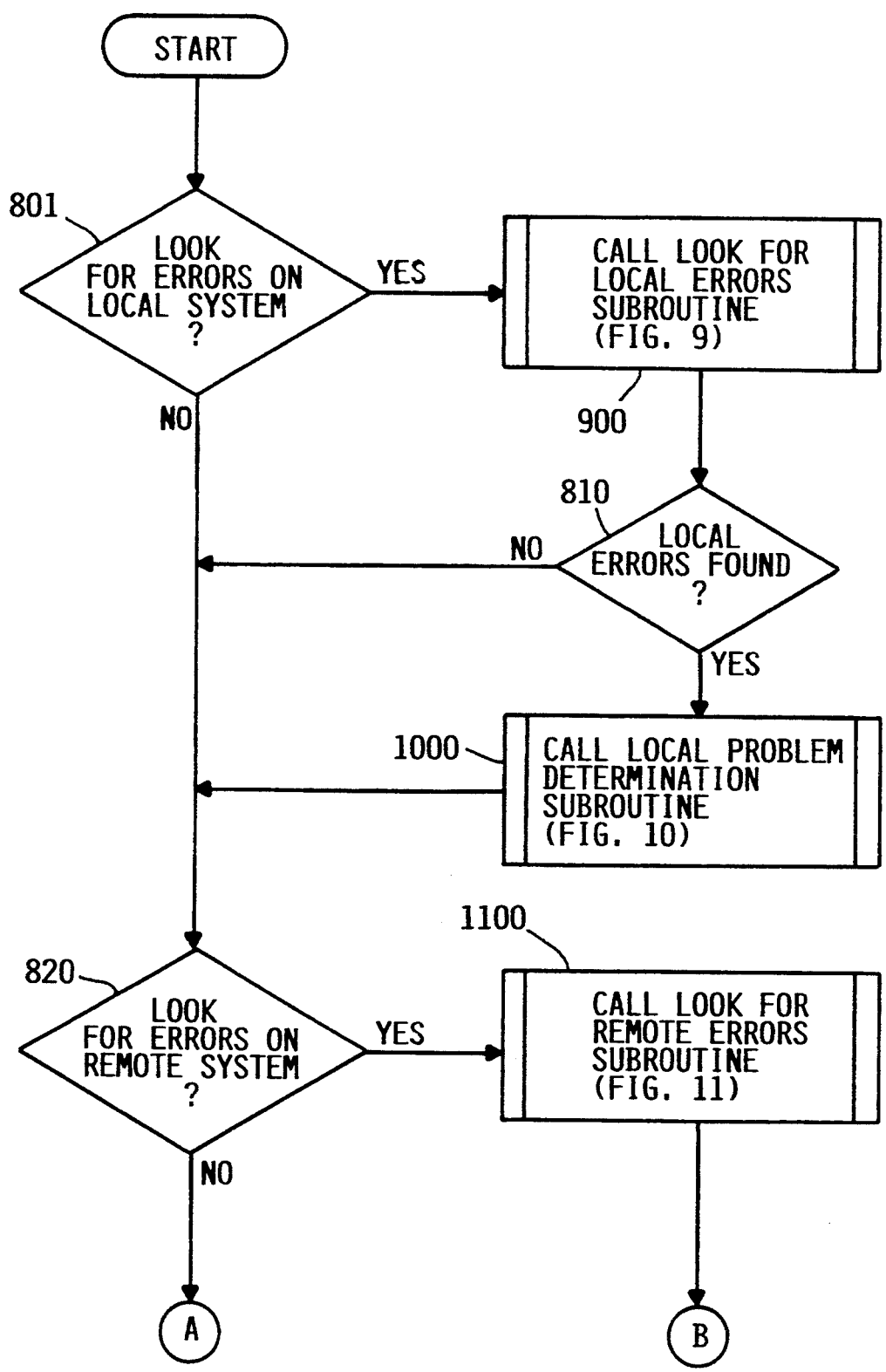
FIGS. 8–12 shows how errors are detected, analyzed, and reported by or for a service requestor.
Figure 8B:
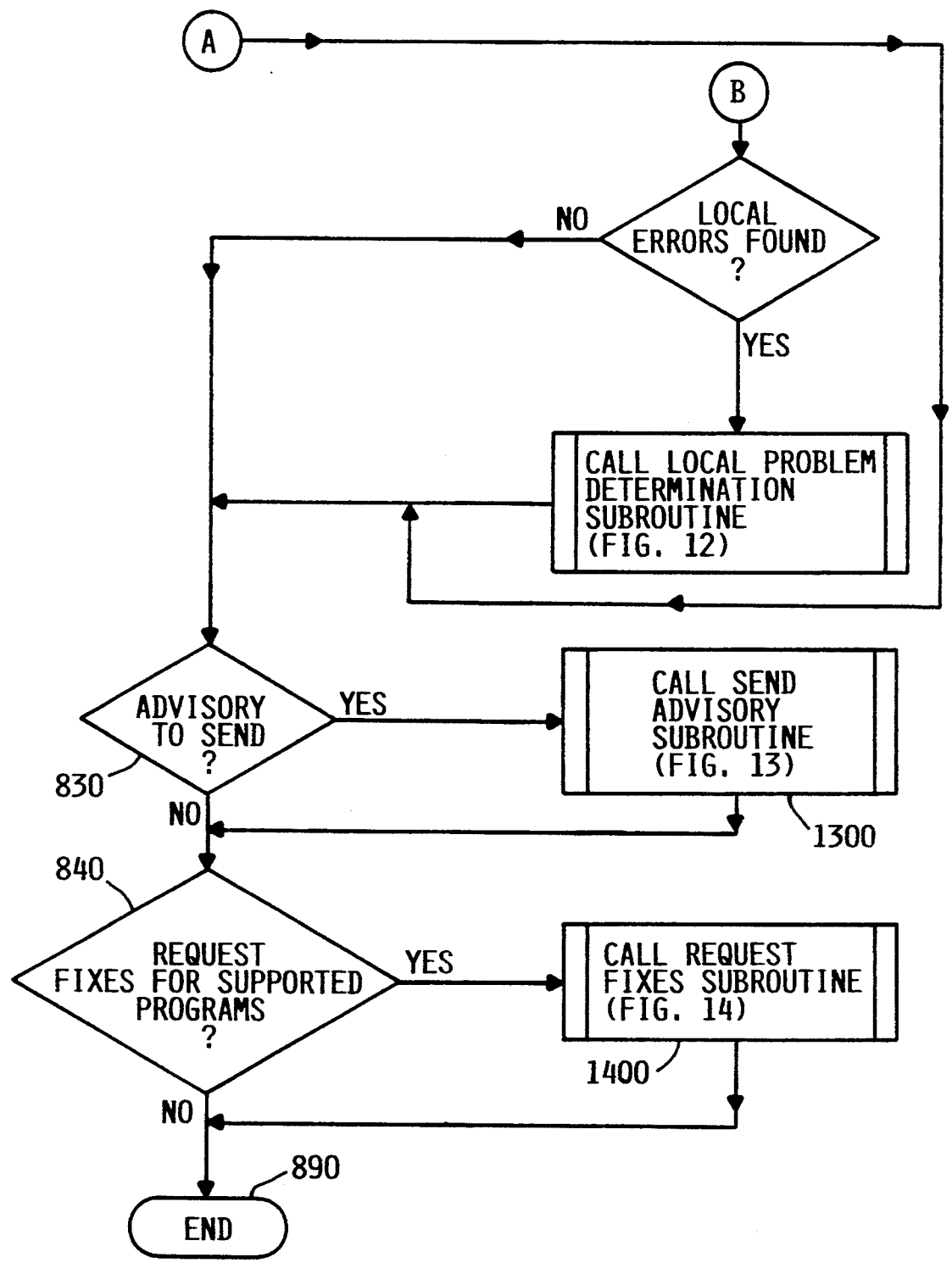
Figure 14:
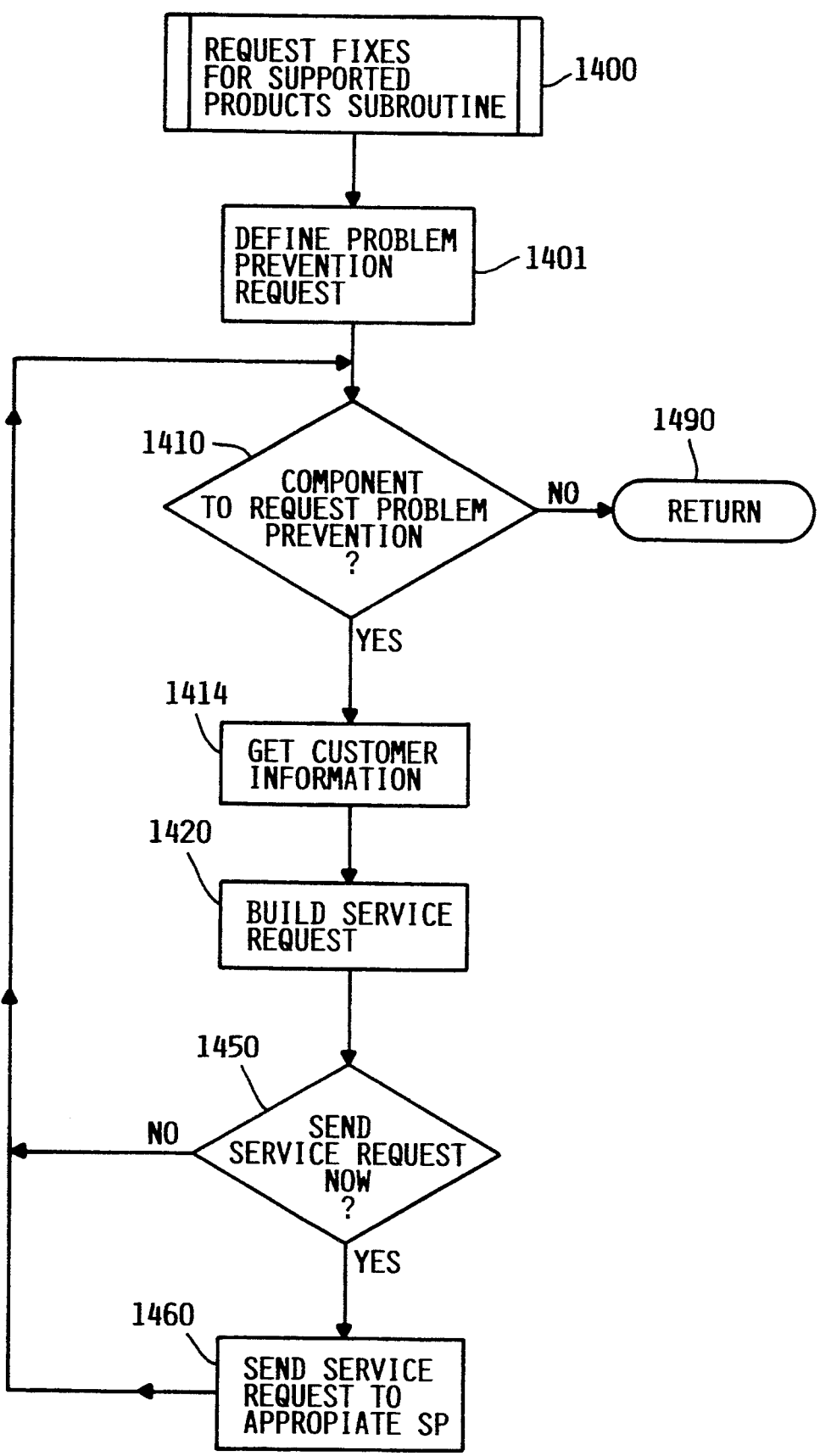
FIG. 14 shows how a service requestor can request fixes for supported components of its computer system.

As has been discussed, a SR can perform problem prevention on itself by requesting any known fixes to problems for a list of supported components. As FIG. 8 shows, block 840 asks if fixes are requested for supported programs. If so, subroutine 1400 of FIG. 14 is called. Block 1401 defines the type of problem prevention request desired. Problem prevention can be done at time of enrollment, where the SR desires to receive all fixes for all components it is requesting the SP to support. Problem prevention could also be done periodically for a particular component. For example, Pete's Catering may decide that it wants to be continually updated on changes to its Spreadsheet program. Therefore, on the first of every month, a request is generated automatically by Pete's system for problem prevention for the spreadsheet program. Problem prevention could also be done at the request of an operator at an SR for one or more selected components. The information needed to determine the type of problem prevention request desired is stored in support database 203.

Referring again to FIG. 14, block 1410 asks if there is a component to request problem prevention. If so, block 1414 gets the customer information from the contact database, and block 1420 writes the service request shown in FIG. 3B2. The service request of FIG. 3B2 contains fields indicating this service request is a problem prevention request for a specified component ID. These fields replace the symptom string and FRU list fields associated with a service request generated when there is a known problem, such as that shown in FIG. 3B1. Block 1450 asks if the service request should be sent now. If so, block 1460 determines which SP(s) supports the component associated with the service request by checking the support database, and sends the service request to that SP. In either event, flow of control returns to block 1410. When block 1410 determines that all requests for problem prevention have been satisfied, the subroutine returns in block 1490 to block 890 in FIG. 8.

The service request is received by the SP and is processed by executing the flowchart of FIG. 16, as has been discussed.

B. Service Provider Instigated

Figure 18:
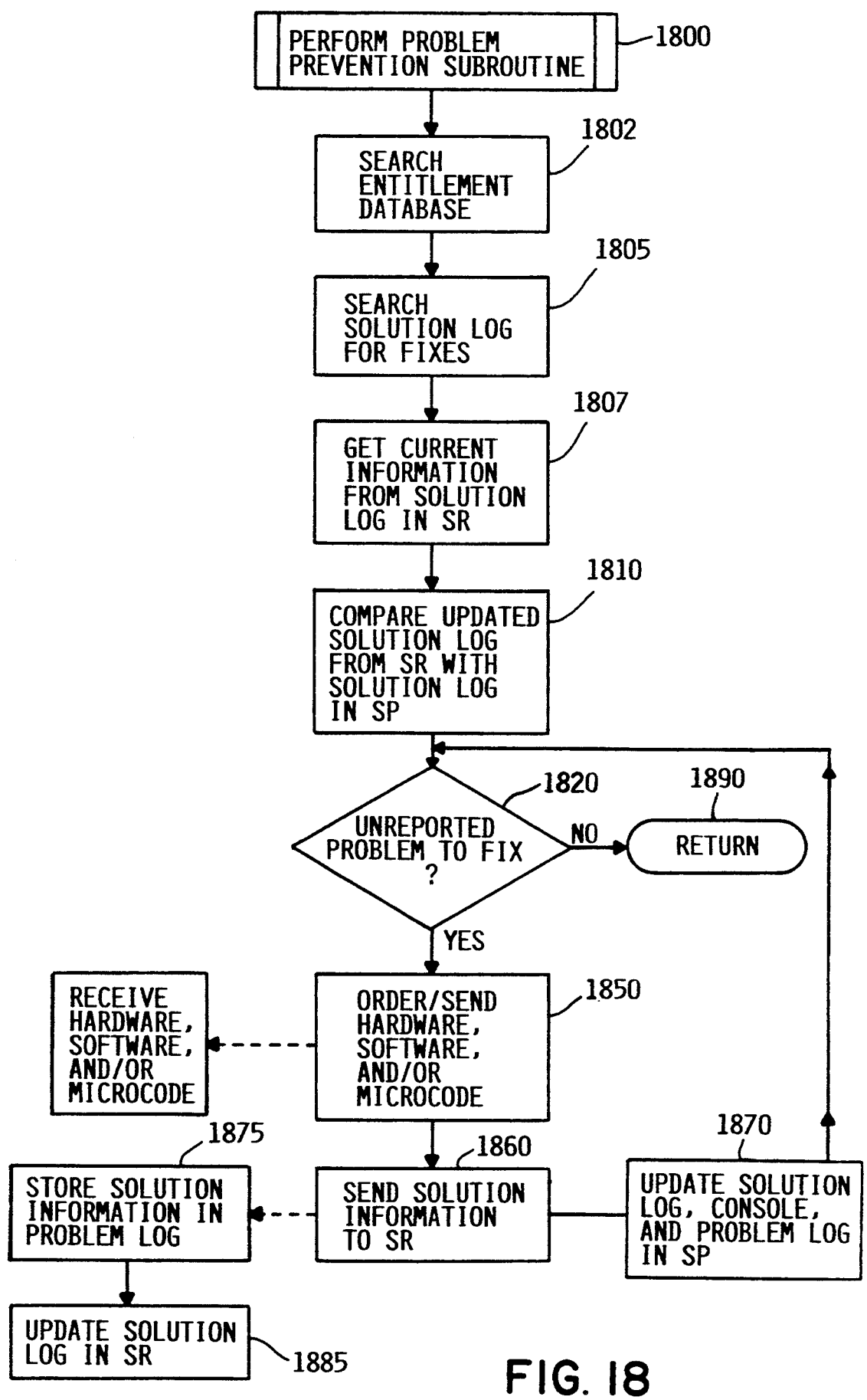
FIG. 18 shows how a service provider performs problem prevention for a service requestor.

A service provider can also perform problem prevention on any service requestors that it supports. The SP checks to see if it has any solutions to problems that one or more SRs that it supports has but has not reported or discovered yet. This is shown in FIG. 15. Block 1503 of FIG. 15 asks the SP if it wants to perform problem prevention. If so, subroutine 1800 of FIG. 18 is called. Block 1802 searches entitlement database 270 to see what components a SR is entitled to receive fixes for. Block 1805 searches the solution log for all fixes having information in the requisite field that indicates this solution is available to be sent in response to a problem prevention request instigated by the SP. It may be desirable to limit problem prevention to only fixes reported by the SR to have fixed the problem (thereby having a status of "VERIFIED"), to avoid needlessly transmitting fixes that did not work.

Block 1807 requests that the SR send a current copy of its solution log to the SP. Although the SP's solution log contains data from the SR that it is aware of, it is possible that the SP's solution log does not contain the most up to date information. This can occur if the SR received solution information from another SP, or if the SR received a component from another source not in the network.

Block 1810 compares the solution log sent from the SR with its own solution log to look for solutions undetected or unreported by the SR (not present in the SR solution log). Block 1820 sees if there is an unreported problem to fix.

If so, block 1850 orders the hardware part(s), sends the software component(s), microcode component(s) and/or textual instructions to the SR. Block 1860 sends the solution information to the SR. Block 1870 updates the solution log, the problem log and the console at the SP, and returns to block 1820 to look for more problem prevention to perform. When block 1820 is answered negatively, the subroutine returns in block 1890 to block 1590 in FIG. 15. When the SR receives the solution information, it executes the flowchart of FIG. 19, as has been discussed previously.

While this invention has been described with respect to the preferred embodiment, it will be understood by those skilled in the art that various changes in detail may be made therein without departing from the spirit, scope and teaching of the invention. Accordingly, the herein disclosed is to be limited only as specified in the following claims.

What is claimed is:

1. A method of enrolling a service provider into a service network of computer systems, said method being performed by a service requestor, said service requestor being a first computer system and said service provider being a second computer system, said method comprising the steps of:
- identifying contact information about said service provider;
- determining a component list for which said service requestor desires to receive service;
- building an enrollment request from said contact information and from said component list;
- transmitting said enrollment request to said service provider; and
- receiving from said service provider an enrollment confirmation notice which is responsive to said enrollment request.

2. The method of claim 1, further comprising the step within said service requestor of:
- updating a support database upon receipt of said enrollment confirmation notice, said enrollment confirmation notice indicating the status of said enrollment request.

3. A method of enrolling a service requestor into a service network of computer systems, said method being performed by a service provider, said service requestor being a first computer system and said service provider being a second computer system, said method comprising the steps within said service provider of:
- identifying contact information about said service requestor;
- determining a component list for which said service requestor is entitled to receive service;
- building an enrollment request from said contact information and from said component list;
- transmitting said enrollment request to said service requestor; and
- receiving an enrollment confirmation notice from said service requestor.

4. The method of claim 3, further comprising the step within said service provider of:
- updating an entitlement database upon receipt of said enrollment confirmation notice.

5. A method of enrolling a service requestor into a service network of computer systems, said method being performed by a service provider, said service requestor being a first computer system and said service provider being a second computer system, said method comprising the machine executed steps within said service provider of:
- receiving an enrollment request from said service requestor, said enrollment request containing contact information and a component list for which said service requestor desires service;
- automatically approving said enrollment request based upon information previously entered in an entitlement database; and
- sending an enrollment confirmation notice to said service requestor.

6. The method of claim 5, further comprising the step within said service provider of:
- updating said entitlement database after said enrollment request is approved, said enrollment confirmation notice indicating the status of said enrollment request.

7. A method of enrolling a service provider into a service network of computer systems, said method being performed by a service provider/requestor, said service provider/requestor being a first computer system and said service provider being a second computer system, said method comprising the steps within said service provider/requestor of:
- identifying contact information about said service provider;
- determining a component list for which said service provider/requestor desires to receive service;
- building an enrollment request from said contact information and from said component list;
- transmitting said enrollment request to said service provider; and
- receiving from said service provider an enrollment confirmation notice which is responsive to said enrollment request.

8. The method of claim 7, further comprising the step within said service provider/requestor of:
- updating a support database upon receipt of said enrollment confirmation notice, said enrollment confirmation notice indicating the status of said enrollment request.

9. A method of enrolling a service requestor into a service network of computer systems, said method being performed by a service provider/requestor, said service provider/requestor being a first computer system and said service requestor being a second computer system, said method comprising the steps within said service provider/requestor of:
- identifying contact information about said service requestor;
- determining a component list for which said service requestor is entitled to receive service;
- building an enrollment request from said contact information and from said component list;
- transmitting said enrollment request to said service requestor; and
- receiving an enrollment confirmation notice from said service requestor.

10. The method of claim 9, further comprising the step within said service provider/requestor of:
- updating an entitlement database upon receipt of said enrollment confirmation notice.

11. A method of enrolling a service requestor into a service network of computer systems, said method being performed by a service provider/requestor, said service provider/requestor being a first computer system and said service requestor being a second computer system, said method comprising the machine executed steps within said service provider/requestor of:
- receiving an enrollment request from said service requestor, said enrollment request containing contact information and a component list for which said service requestor desires service;
- automatically approving said enrollment request based upon information previously entered in an entitlement database;
- and sending an enrollment confirmation notice to said service requestor.

12. The method of claim 11, further comprising the step within said service provider/requestor of:
- updating said entitlement database after said enrollment request is approved, said enrollment confirmation notice indicating the status of said enrollment request.

* * * * *